(12) United States Patent
Cotton et al.

(10) Patent No.: US 7,016,919 B2
(45) Date of Patent: Mar. 21, 2006

(54) ENTERPRISE FRAMEWORK AND APPLICATIONS SUPPORTING META-DATA AND DATA TRACEABILITY REQUIREMENTS

(75) Inventors: Todd Cotton, Palo Alto, CA (US); Karen M. Gardner, San Francisco, CA (US); Robert Konitzer, Shelby, NC (US); Mary Jane VanSant, Marietta, GA (US)

(73) Assignee: Agilent Technologies, Inc., Palo Alto, CA (US)

( * ) Notice: Subject to any disclaimer, the term of this patent is extended or adjusted under 35 U.S.C. 154(b) by 496 days.

(21) Appl. No.: 10/112,291

(22) Filed: Mar. 29, 2002

(65) Prior Publication Data

US 2003/0187821 A1    Oct. 2, 2003

(51) Int. Cl.
*G06F 17/30* (2006.01)
(52) U.S. Cl. .................................... 707/104.1; 707/100
(58) Field of Classification Search .................... 707/1, 707/2, 3, 4, 5, 6, 7, 8, 9, 10, 104.1; 709/229, 709/202; 715/513, 840; 713/168; 705/59
See application file for complete search history.

(56) References Cited

U.S. PATENT DOCUMENTS

| | | | |
|---|---|---|---|
| 5,629,981 A | 5/1997 | Nerlikar ..................... | 713/168 |
| 6,028,605 A | 2/2000 | Conrad et al. .............. | 715/840 |
| 6,078,914 A | 6/2000 | Redfern ........................ | 707/3 |
| 6,108,420 A | 8/2000 | Larose et al. ................. | 705/59 |
| 6,125,383 A | 9/2000 | Gynias et al. ............... | 709/202 |
| 6,314,425 B1 * | 11/2001 | Serbinis et al. ................ | 707/10 |
| 6,418,448 B1 * | 7/2002 | Sarkar ...................... | 707/104.1 |
| 6,453,353 B1 * | 9/2002 | Win et al. .................... | 709/229 |
| 6,505,218 B1 * | 1/2003 | Umen et al. ................. | 715/513 |
| 6,775,665 B1 * | 8/2004 | Piersol .......................... | 707/4 |

OTHER PUBLICATIONS

Flexible Content Management for XML by the XML Handbook, Chrystal Software.
Providing Document Management Tuned for Technical Publications, p. 1-7, ASTORIA Specialized Authoring Support System, Chrystal software.
Content Management Will Emerge as the Perferred Method of Managing Valuable Corp rate Information, ASTORIA 3.6 Proven Content Management (Mar./2001).
Nene et al., "A simple Algorithm for Nearest Neighbor Search in Hight Dimensions," IEEE Transactions of Pattern Analysis and Machine Intelligence, vol. 19, No. 9, Sep. 1997.

* cited by examiner

*Primary Examiner*—Jeffrey Gaffin
*Assistant Examiner*—Yicun Wu

(57) ABSTRACT

An application adapted to run within an enterprise wide, web-based framework which provides reusable services and facilities such as security, meta-data management and traceability of data and a framework supporting the same. The framework supports decision making across the value chain, with an emphasis on the meta-data needed for decision making. The framework can support the activities of a virtual organization (internal or external) and the inevitable variations in data types, file formats etc. without requiring massive integration between the various sources of data involved.

26 Claims, 21 Drawing Sheets

Primary Table

| Unique Identifier | Address of Data |
|---|---|
| Primary Key 1 | Address of Data 1 |
| Primary Key 2 | Address of Data 2 |
| ⋮ | ⋮ |
| Primary Key X | Address of Data X |

FIG. 8A

Secondary Table

| Primary Meta-Data Key | Type of Meta-Data | Value of Meta-Data | Foreign Key (unique identifier) |
|---|---|---|---|
| 1 | Description | an xml play | Primary Key 1 |
| 2 | Author | Shakespeare | Primary Key 1 |
| 3 | Version | 1.0 | Primary Key 1 |

FIG. 8B

*Meta-Data Table (Secondary Table)*

| Primary Meta-Data Key | Type of Meta-Data | Value of Meta-Data | Foreign Key |
|---|---|---|---|
| 1 | MELTING POINT | 120 | 123 |
| 2 | FREEZING POINT | 32.5 | 123 |
| 3 | EVAPORATION POINT | 212 | 123 |

*Meta-Data Tableau*

| Foreign Key | MELTING POINT | FREEZING POINT | EVAPORATION POINT |
|---|---|---|---|
| 123 | 120 | 32.5 | 212 |
| 124 | 122 | 21 | 222 |
| 125 | 100 | 5 | 192 |

*Inverted Meta-Data Tableau*

| Foreign Key | 123 | 124 | 125 |
|---|---|---|---|
| MELTING POINT | 120 | 122 | 100 |
| FREEZING POINT | 32.5 | 21 | 5 |
| EVAPORATION POINT | 212 | 222 | 192 |

ENTERPRISE FRAMEWORK AND APPLICATIONS SUPPORTING META-DATA AND DATA TRACEABILITY REQUIREMENTS

FIELD OF THE INVENTION

The present application relates to the field of enterprise wide web-based frameworks and reusable applications and facilities running within such a framework.

BACKGROUND OF THE INVENTION

The biopharmaceutical industry value chain (disease discovery through post-market patient surveillance) is supported by large numbers of disparate, heterogeneous and incompatible software solutions and instrumentation. This results in significant inefficiencies, high costs and lack of control over the information residing in these many systems. In particular, solving the problems associated with management of scientific data is a critical success factor for biopharmaceutical companies in their efforts to achieve growth and revenue targets. The primary method currently employed by biopharmaceutical companies to solve the scientific data management problem has been the effort to integrate at least a portion of the systems supporting Research and Development. These data integration efforts have resulted in the creation of large (often federated) databases and/or integrated research platforms for the scientists.

Document Management Systems

Efforts at improving scientific data management include document management systems, which are increasingly addressing the content of documents, not just the management of the documents. However, as a general rule, these systems are concerned primarily with the syntactic aspects of meta-data (e.g., section 2 is placed in a specified position) and the management of the documents themselves.

Documentum currently has the largest market share for document management systems used in managing scientific data and provides the most extensive document and content management functionality. Documentum does not, however, support backward and forward traceability and does not appear to offer fine-grained entitlements, nor does it provide semantic content management.

GMPharma is a joint product of Documentum and PWC that has been developed specifically for the pharmaceutical market. It manages controlled documents and meets GMP regulatory requirements. It does not appear to support backward and forward traceability, fine-grained entitlements, or semantic content management.

PharMatrix [Opentext] is a system designed for pharmaceutical companies to coordinate and manage information. It captures, stores and disseminates information in the drug discovery phase. It does not support backward and forward traceability, fine-grained entitlements, or semantic content management. It is only available in Windows.

Astoria [Chrystal Software] is an XML based content management system. It addresses primarily the syntactic aspects of organizing a document (e.g., which parts are video, which are graphs, and the like) and does not support backward and forward traceability nor does it appear to offer fine-grained entitlements.

CyberLab [Scientific Software] is a 21 CFR 11 compliant system that manages laboratory data by cataloging, indexing, storing and keyword retrieval of everything from raw data to compliance records. It is only available in Windows. Although auditability (who did what, when and where) is supported, fine-grained traceability and fine-grained entitlements are not supported.

CoreDossier and Liquent [ESPS] are document management systems for regulated documents. They do not support semantic meta-data, entitlements or fine grained traceability.

Integrated Research Platforms

An integrated research platform is a software system that allows the scientific user (primarily in drug discovery rather than drug development) to access, manage and analyze integrated scientific data from a variety of external and internal databases. An integrated research platform is usually a solution that includes a set of products (generally proprietary).

The SRS [Lion] system provides access to a number of external databases and rudimentary managing of the resulting information. The products include a number of analytic software packages and visualization tools that are used to evaluate the data. The SRS [Lion] system does not support traceability or entitlements at any level. The use of meta-data is minimal.

Synergy (NetGenics) is a data management system that allows access to normalized integrated gene expression data from a combination of sources and which includes a set of tools to analyze the data. Synergy (NetGenics) does not support traceability, semantic meta-data or entitlements, nor is it concerned with regulatory requirements.

UNIFY, VISION and ARCHIVE [NuGenesis] make up a data management system/document repository that captures data from disparate sources, allows viewing and "cutting and pasting" of contents and automatic archiving designed to meet GLP/GMP (i.e., "Good Lab Practices"/"Good Manufacturing Practices") guidelines. This data management system/document repository does not support fine-grained traceability, entitlements or meta-data.

GenoMax [InforMax] is a data mining platform that integrates results of genomic data analysis. It supports processing of massive amounts of disparate data types. It does not appear to support meta-data, entitlements or traceability.

Nouveau Alliance® [Nouveau Systems]is an enterprise collaborative information and process management platform targeted at the needs of R&D organizations which enables solutions that support automated capture and management of both information and process, and extended collaboration across the R&D organization.

Knowledge Management Systems/Decision Support Systems

Knowledge Management Systems/Decision Support Systems strengthen some kind of choice process. In the pharmaceutical industry, these systems are primarily simulation software systems targeting very precise areas (e.g., modeling of organic compounds). The present invention may provide services to these kinds of systems.

Insight II [MSI] provides a range of simulation and modeling systems that target molecular modeling. It does not appear to support meta-data, entitlements or traceability.

MineSet [SGI] provides data visualization in a 3D format and the ability to subject the data to "what if" analyses.

PhysioLab [Entelos] predicts the results of experimental studies and does not appear to support meta-data, entitlements or traceability.

TrialSimulator[Pharsight] optimizes, simulates and analyses clinical trial design. It does not appear to support meta-data, entitlements or traceability.

Workflow Systems

Workflow systems manage business processes. These systems define the flow of work and data, guarantee the consistency of procedures, and track and measure various metrics associated with processes.

FileNET [Panagon] emphasizes the information flow and the integration of structured and unstructured data. FileNET does not support entitlement, traceability or the use of meta-data.

MQSeries Workflow [IBM] appears to be strictly workflow control oriented and does not support content management, entitlements, meta-data or traceability.

Integration Manager [Tibco] automates and manages standard sequences of events that occur in a business. It does not appear to support content management, meta-data, traceability or entitlement.

W4 [W4] states that it is the gateway to the fully integrated value chain through its support of the virtual organization. W4 positions itself as a production, administrative and collaborative workflow product. W4 does not support meta-data, traceability or entitlements.

SUMMARY OF THE INVENTION

The present invention provides an enterprise wide, web-based framework, which is a type of flexible software architecture that provides reusable services and facilities to the applications running within the framework, as well as applications, services and facilities running within the framework. Applications built using the services and facilities can be built in a fraction of the time it generally takes to construct a system. Existing applications can benefit from utilizing selected services/facilities provided by the framework. The framework supports decision making across the value chain, with an emphasis on the meta-data needed for decision making. Thus the framework is not workflow oriented. The framework is designed to anchor the value chain of a domain-specific industry by providing management of meta-data across the value chain, as well as providing a host of other services/facilities designed to support the users and decision makers in their work. Meta-data is information about data that adds significant semantic richness to the understanding of the actual data. The present invention especially emphasizes the meta-data associated with major decision points across the value chain. The present invention allows for the creation and management of the meta-data associated with individual applications. Thus the data created and used by an application is enhanced by the present invention.

Methods of managing within an enterprise-wide, web-based framework are also disclosed, to include the steps of: marking up data to be managed within the framework with predefined types of meta-data; submitting the marked up data to the framework; assigning a unique identifier to be associated with the data and a location in which the data is to be stored; storing the unique identifier and location for subsequent access to the data; assigning a unique primary key to each item of meta-data associated with the data; and storing each item of meta-data with its unique primary key, type of meta-data and the unique identifier connecting the item of meta-data with the data.

A hierarchy of dossiers may be provided, into which artifacts, defined by the meta-data stored, are classified. Further, roles, teams and or users may be defined along with defining levels of entitlement to each user, role or team which define which of the dossiers each user, role or team can access and what degree of access is allowed for each, thereby defining which of the dossiers each user, role or team will be entitled to access.

A unique entitlement token can be assigned to each user upon sign in for access to the framework, wherein the unique entitlement token is good only for the session, and wherein the unique entitlement token is deleted upon sign off.

Data that is submitted to the system according to the present invention will be rejected if all items of meta-data required by a schema defining the submission of data have not been entered with the data. Further, any overwriting, alteration, editing or deletion of the data and meta-data is prohibited, once a unique identifier has been assigned to the data submitted and stored.

Annotations may be written with regard to the submitted data by a user with entitlement, and the annotations are stored with the meta-data associated with the data.

Searches may be performed on the stored meta-data associated with artifacts selected by a user from a dossier among those dossiers which the user is entitled to, thereby defining a subset of the data collected in the dossier.

The present invention further provides a collection of predefined templates (which may include templates compliant with requirements of 27 C.F.R. 11) from which a user can choose a template in which to assemble select portions of a subset of data selected by the user. A completed template may be stored as a new artifact and linked to unique identifiers of the select portions of data. A completed template may further be exported to a user's local drive.

Events are generated by actions such as submissions of new versions of, annotations written to the data, and marking of data for deletion. Each of these actions are also stored with the meta-data associated with the data and are linked to the unique identifier of the data. Each event is stored with a time stamp, and a traceability report can be generated based on the events, thereby creating a history of all events that have occurred with regard to the data.

An application adapted to run within an enterprise wide, web-based framework is disclosed to include a schema requiring predefined types of meta-data to be marked up with new data to be submitted to the framework; means for assigning a unique identifier to each new data submitted; means for assigning an address outside of the framework where the new data will be stored; means for storing the unique identifier associated with the address; and means for assigning primary keys to each item of meta-data associated with the new data and storing each item of meta data associated with its primary key, type of meta-data and a foreign key which points to the unique identifier.

The application may further include means for generating an event each time new data is submitted and each time annotations, alterations, or new versions of the data are entered into the application; means for linking the events to the unique identifier of the associated data; and means for storing the events and linking unique identifiers.

Still further, means for generating a traceability report of the entire history of an artifact of data, based on searching the events generated and stored with regard to that data are provided.

Also disclosed are applications comprising means for creating a hierarchical classification of dossiers; means for assigning data to a selected dossier; means for defining user entitlement to each dossier created, wherein a system administrator establishes users, roles and teams and defines which of the dossiers each specific user, role or team is entitled to access; and means for preventing access to data in a dossier which a user, role or team is not entitled to access.

Further, means for creating a personal dossier at the user level are provided, which a user can create and manage and which can be shared by other users having entitlement thereto.

Means for identifying and searching on information that a user wishes to associate with data selected from a dossier that the user is entitled to may be provided in an application according to the present invention.

The present invention also may include means for assigning a unique UserID and password to each user authorized to use the application. An entitlement token may be assigned to a user, based on matching the user's unique UserID and password with the same UserID and password stored in the application, wherein the entitlement token is good only for a current session of use, and is deleted when the user logs off.

These and other objects, advantages, and features of the invention will become apparent to those persons skilled in the art upon reading the details of the invention as more filly described below.

BRIEF DESCRIPTION OF THE DRAWINGS

FIG. 6 is a screen print of an example of a splash form or splash page that is displayed on the GUI of a user in response to a successful log-on.

FIG. 8A is a schematic representation of a primary table used to store the value of the primary key of the data and address of the data submitted.

FIG. 8B is a schematic representation of a secondary table used to store meta-data associated with the data having been submitted.

FIG. 8C is another schematic representation of a secondary table used to store meta-data associated with the data having been submitted.

FIG. 8D is a schematic representation of a meta-data tableau having a column for each type of meta-data that is stored with regard to a data file, and which stores the values of each of these types in a single row corresponding to the primary key of the data.

FIG. 8E is a schematic representation of an inverted meta-data tableau which inverts the matrix of the meta-data tableau to form vectors useful for optimizing multi-dimensional searches.

DETAILED DESCRIPTION OF PREFERRED EMBODIMENTS

Figure 1:
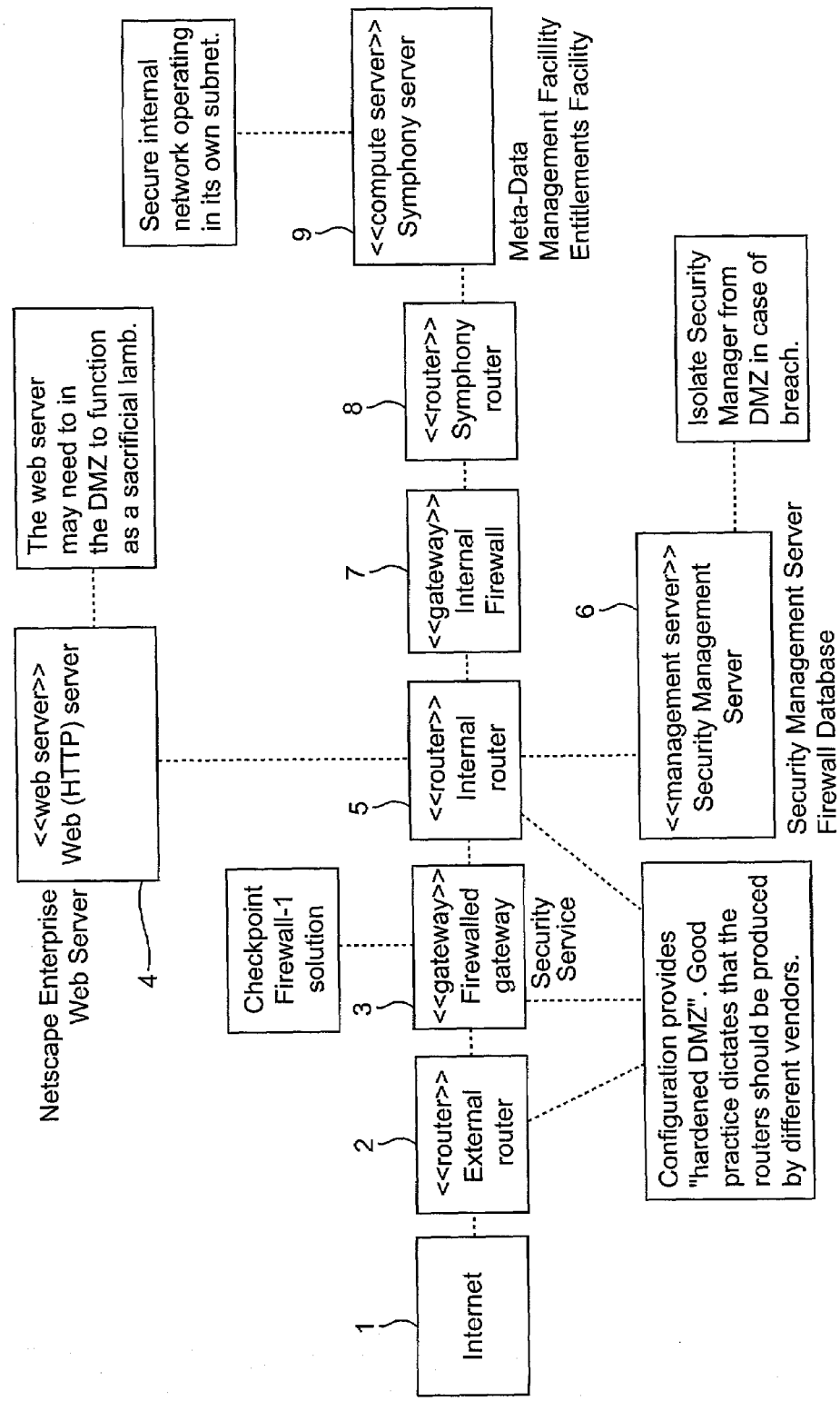
FIG. 1 is a schematic diagram showing an example of a typical network configuration of physical components involved in accessing the applications according to the present invention, including servers containing the applications.

Before the present systems, applications and methods are described, it is to be understood that this invention is not limited to particular methodology described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and solutions similar or equivalent to those described herein can be used in the practice or testing of the present invention, the preferred methods and solutions are now described. All publications mentioned herein are incorporated herein by reference to disclose and describe the methods and/or applications in connection with which the publications are cited.

It must be noted that as used herein and in the appended claims, the singular forms "a", "and", and "the" include plural referents unless the context clearly dictates otherwise. Thus, for example, reference to "a file" includes a plurality of such files and reference to "the user" includes reference to one or more users and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DEFINITIONS

The term "enterprise framework" refers to a type of flexible software architecture that provides reusable services and facilities to the applications running within the framework.

The term "service" refers to a non-domain specific process that provides support to one or more applications (e.g., security, meta-data management, etc.).

The term "facility" refers to a domain specific process that provides services to one or more applications (e.g., traceability of data).

The term "software architecture" refers to the structure or structures of a computing system which include software components, the externally visible properties of those components and the relationship among them.

The present invention provides an enterprise wide, web-based framework, which is a type of flexible software architecture that provides reusable services and facilities to the applications running within the framework, as well as applications, services and facilities running within the framework. Applications built using the services and facilities can be built in a fraction of the time it generally takes to construct a system. Existing applications can benefit from utilizing selected services/facilities provided by the framework. Services are non-domain specific processes that provide support to one or more applications (e.g., security, meta-data management). Facilities are domain specific processes that provide services to one or more applications (e.g., traceability of data). The framework supports decision making across the value chain, with an emphasis on the meta-data needed for decision making. Thus the framework is not workflow oriented.

Increasingly, small to medium sized companies in particular, are participating in virtual organizations that cover the entire value chain. The present invention can support the activities of such virtual organizations (internal or external) and the inevitable variations in data types, file formats etc. without requiring massive integration between the participating companies' data.

The framework is designed to anchor the value chain of a domain-specific industry by providing management of meta-data across the value chain, as well as providing a host of other services/facilities designed to support the users and decision makers in their work. Meta-data is information about data that adds significant semantic richness to the understanding of the actual data. As mentioned previously, the present invention especially emphasizes the meta-data associated with major decision points across the value chain.

Thus, the present invention is not a data management system in the traditional sense of the word. Data can reside in multiple places; the objective is not to integrate the data but to provide meaningful access to it and an understanding of it via the use of meta-data. The present invention provides a set of services and facilities to disparate systems and databases (in the biopharmaceutical industry, as one example) that allow the user to use best of breed applications without having to worry about integrating all the data used by the applications. The present invention can, however, support integrated systems as well.

The present invention allows for the creation and management of the meta-data associated with individual applications. Thus the data created and used by an application is enhanced by the present invention.

Network Configuration

Referring to FIG. 1, a schematic diagram showing an example of a typical network configuration of physical components incorporating the framework of the present invention and used in accessing the applications according to the present invention is shown. The framework may be configured for access via the internet 1 such that anyone with access to the internet and entitlement to use the present invention can access the present invention via the internet. An external router 2 (available from Cisco Systems, Inc., San Jose, Calif., for example) directs internet traffic initially through a "demilitarized zone" (DMZ) comprised of multiple security firewalls The first or external firewall 3 is the firewall gateway separating the internet from the intranet and may be a Firewall-1 solution provided by Check Point Software Technologies, Inc. of Redwood City, Calif.

A security management server 6 contains a firewall database and is connected with the first and second firewalls 3,7 via internal router 5, which may also be provided by Cisco Systems, Inc. The security management server 6 cooperates with the external firewall to "interrogate" a prospective user to determine whether or not that user is authorized to enter and use the system according to the present invention.

A web-based (HTTP) server 4 is also connected to internal router 5 and provides the user interface between a user and the system according to the present invention. No business data is maintained on the HTTP server 4 in order to provide an extra layer of security, such that, if the HTTP server is compromised, no business data is obtained. However, a manager proxy on the HTTP server contains business logic which talks through the internal firewall 7 to access business data from the framework server 9. Thus, the HTTP server 4 contains only the presentation portions of the framework applications (e.g., JAVA server pages, designed to provide the intended layout of each page as it is presented to the user at this interface) and the business logic necessary to communicate with the framework server when authorized. HTTP server 4 is the single point of access to the system according to the present invention, as all users, both internal and external must access the system through the HTTP server 4. Thus, security is not relaxed for internal users of the system, as they will be subjected to the full DMZ security architecture, and must pass both the firewalled gateway 3 and the internal firewall 7 to access the system.

Upon accessing the HTTP server, a potential user must then log in with an authorized user name and password in order to get through the internal firewall 7 (which may also be a Firewall-1 provided by Check Point Software Technologies, Inc.) in order to access the framework server 9 through framework router 8. Framework server 9 contains and manages meta-data, entitlements and traceability of the data of interest.

Mechanism

The framework implements a variety of mechanisms to accomplish the tasks according to the present invention. A single point of entry mechanism is provided in the form of a servlet called Front (Sun Microsystems, Palo Alto, Calif.), through which all requests are sent from a client or user. Thus, Front provides a global point of entry to the framework server 9. Bypassing Front and directly accessing system resources (e.g., from framework server 9) from a browser, applet, or B2B client is a violation of the framework architecture. Front acts in the role of lightweight request dispatcher by associating a controller (Servlet) with a submitted request and dispatching the request to a target controller.

A request dispatched to a controller is processed in a command. The command fulfills the business request by sending messages to the framework server 9 via a manager proxy mechanism. The command then bundles output data retrieved from server 9 in a bean and dispatches a request to a JAVA server page which renders content back to the browser of the user that initially sent the request to Front.

A command management mechanism maintains a reference between a request and a method on the command that fulfills the processing of the request (as described above). The command manager looks up the command responsible for fulfilling the request and executes a framework method that invokes the appropriate method on the command for that request.

The presentation mechanism provides a clear separation between content management on the server side (e.g., the framework server 9) and presentation on the user side (e.g., HTTP 4 and the user's interface). The presentation mechanism is responsible for rendering content provided to it by a command mechanism. All content rendered by the presentation mechanism is provided by a command. The presentation mechanism is explicitly forbidden from accessing services or system resources (e.g., the framework server 9). Commands are extendible and may be varied for particular applications. Specialized classes of commands implement methods that perform processing of requests. Manager proxies implement the logic for sending requests to the framework server 9.

The presentation command is a general pattern that enables various interactions between the HTTP server 4 and a framework application (e.g., accessing framework server 9). The pattern forces method calls to be invoked on specialized framework presentation command objects based on a unique request name. For example, in order to effect a command called "FRAMEWORK DOSSIER COMMAND" a "FrameworkAddPageRequest" is submitted to Front and the Controller associates this command with the "FRAMEWORK DOSSIER COMMAND". The Command Manager appends a "process" command to "FrameworkAddPageRequest" to form the method "processFrameworkAddPageRequest" which invokes the function of "FRAMEWORK DOSSIER COMMAND". As another example, a function for adding a dossier ("FRAMEWORK ADD DOSSIER REQUEST") is invoked by creating the method "processFrameworkAddDossierRequest" in a manner similar to that described above.

All interaction with the presentation framework must be carried out using the presentation command pattern. The commands used in the presentation command pattern may encapsulate the processing necessary to fulfill a single request or may act as a container for processing multiple request types organized along principles defined by the lead application designer. The latter approach is followed in the framework to prevent an explosion in the number of classes that must be maintained.

Client or user objects "wrap" request data in a request object that is sent to the presentation framework. This data must include a FRAMEWORKREQUESTID that represents a unique request as a string. Additional data for fulfilling the request is also wrapped in the request. The simplest implementation of wrapping is accomplished in an html page using form processing and hidden fields. For other agents, (Applets, B2B Clients, etc.) utilities to wrap and unwrap request data are defined by the application design specification.

When the Front framework object receives a request it unwraps the FRAMEWORKREQUESTID and forwards the request to the instance of the Framework Presentation Controller that implements the command for processing the submitted request. Each Framework Presentation Controller implements a Command Manager. The Command Manager is responsible for invoking the method on the command that provides fulfillment of the request.

The process method on the extended Framework Presentation Command collaborates with Framework Access Beans to execute business logic for fulfilling the request. For browser clients, output data is passed to a Java Server Page (JSP) that is responsible for formatting the content and sending a response to the browser. The JSP is forbidden from accepting client input or collaborating with Framework Access Beans to access framework services.

To configure the framework for a specific application, the classes that must be specified depend upon the variant of client type that is being implemented. The following variants have been identified to date and are accommodated by the Presentation Framework. A simple browser request/response is a type of application characterized by a request posted from an html browser using a form. The request is fulfilled through method invocations on the Framework Manager Proxy and the result is returned via a Java Server Page. An intermediate browser request/response with XML formatting is a type which is similar to the simple variant but XML is sent to the JSP. The JSP renders html output using XML tools to render the content. An advanced non-browser request/response is a type which is used for implementing applets and Business to Business (B2B) requests. It uses http tunneling to communicate with Front and follows the standard command flow but uses a custom response mechanism versus Java Server Pages.

Application Partitioning

Figure 2:
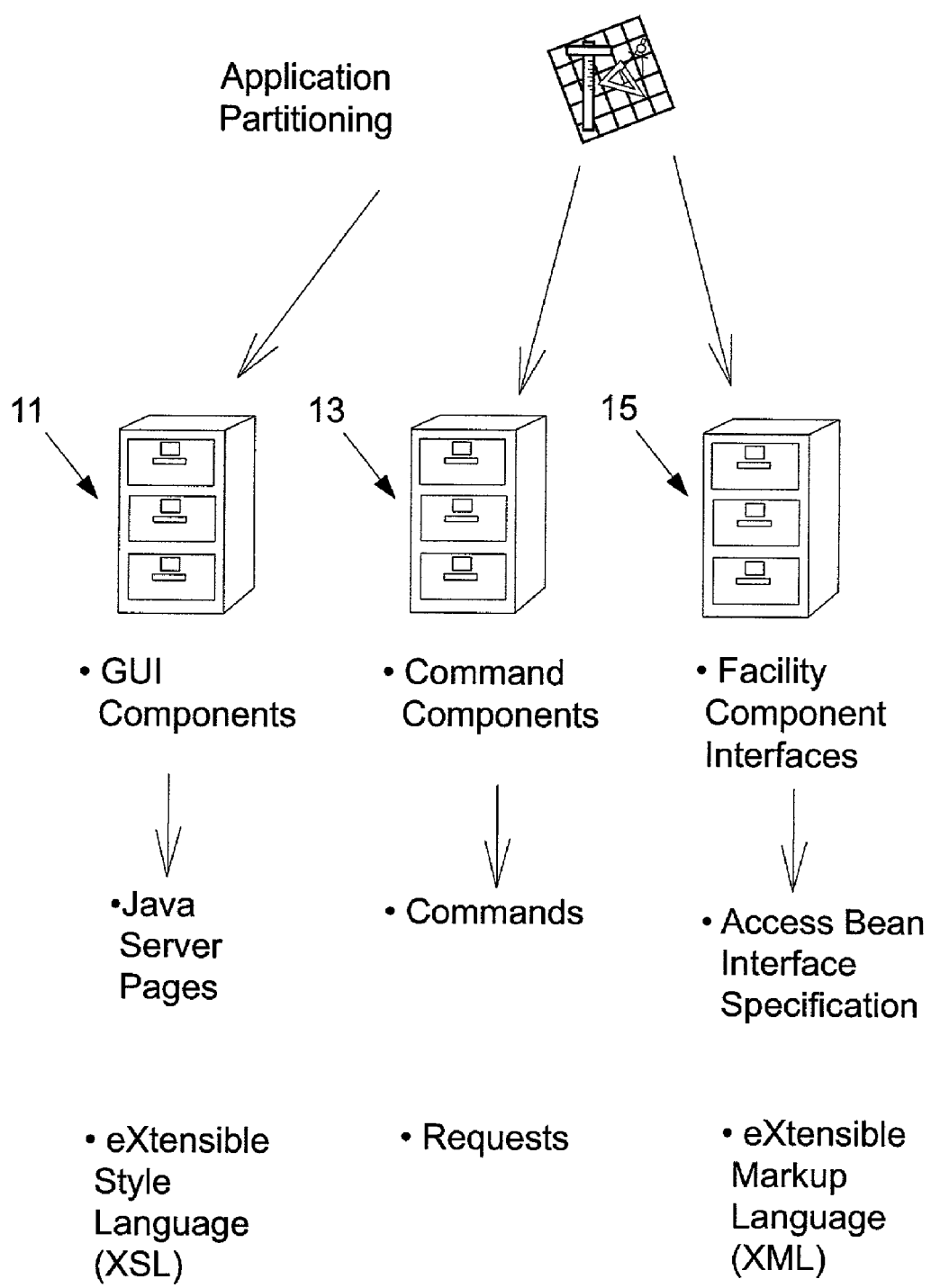
FIG. 2 is a diagrammatic representation of the partitioning of an application using the framework according to the present invention.

FIG. 2 is a diagrammatic representation of the partitioning of an application using the framework according to the present invention. FIG. 2 shows partitioning for an intermediate browser request/response with XML formatting, although similar partitioning is performed for simple and advanced user requests/response as well, in order to preserve the integrity of the data on the framework server 9.

GUI components 11 are responsible for rendering content in html to a client/user. GUI components implement the presentation mechanism and use Java Server Pages (JSP) and XSL transformations (in the intermediate request example) based on XSL to convert business data received from the framework server 9 in a manner consistent with commands received from the command components 13.

Command components 13 are responsible for controlling the behavior of the GUI. They implement the command mechanism. Requests that are sent from the GUI are fulfilled in command methods that interact with Access Beans at the Facility Component 15 level. Based on responses to service requests the command component 13 passes content in the form of objects to JSPs for rendering.

Facility component interfaces 15 define the contract between the command and the facilities in the framework (e.g., the framework server 9). Business methods, their signatures, pre-conditions, post-conditions, invariants, and exceptions are encapsulated in manager proxies. All data returned from the manager proxies is in the form of XML Strings. Therefore, XML schemas required for content rendering are specified at this level.

Architecture Overview—Package and Subsystem Layering

Figure 3:
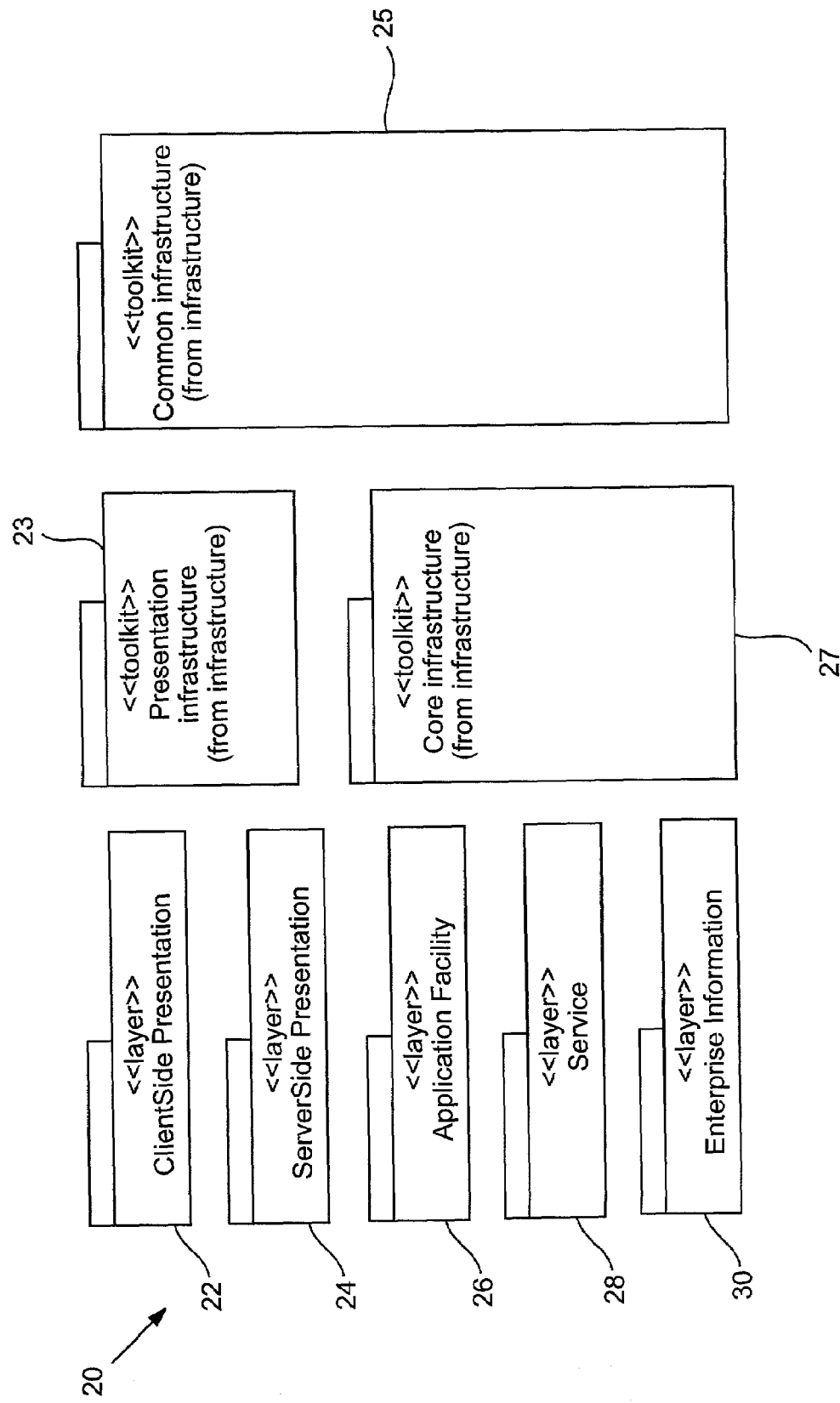
FIG. 3 is a diagram representing the organization of the present software architecture 20 in layers.

FIG. 3 is a diagram representing the organization of the present software architecture 20 in layers. The presentation tier (or layer) 22 supports two user interface types: web based interface: a thin client based on HTML/XML, in which HTML may use Applets to enrich the user experience but must be used judiciously; and Java Applications (stand-alone web clients), which provide feature rich applications). The presentation layer 22 is responsible for hosting an HTML rendering of form-based requests for user interaction with the system (e.g., via a browser).

The server side presentation tier (layer) 24 interacts with a user above and with the client side presentation 22 above and the server side business layer 26 below. Server side presentation layer 24 is responsible for presenting views on the application's state and actions to an end user, and for conveying end-user actions to the application. It is responsible for managing the dialog with the client side presentation layer 22. The server side presentation tier 24 is responsible for rendering HTML/XML for client side presentation and processing requests to business logic tier services. Java Server Pages and Servlets are used to enable the services required of the server side presentation tier 24. Integration to the server side business logic tier is implemented in the application facility as a manager proxy.

The application facility layer 26 interacts with the server side presentation layer 24 above and with anything below. It is responsible for implementing the business process represented by the application, managing the dialog with the server side presentation layer 24 and coordinating the activities of the services and business objects used by the application.

The server side business logic tier, implemented by the Manager Proxy in the application facility layer, provides a robust service environment, as there is a minimal need for configuration and administration. The server side business logic tier is easily extensible and provides performance and fault tolerance through redundancy. JMS (Java Messenger Service) is used to enable the services required of this tier. Integration to the enterprise information system tier is accomplished using J2EE (Java 2 Enterprise Edition).

The service layer 28 interacts with the server side business logic layer above and with the enterprise information layer 30 below. The service layer 28 is responsible for implementing discrete functions (e.g., "Log-On", "Add User", etc.) used by larger business processes (i.e., facilities).

The enterprise information system tier 30 represents a company's data assets in the form of data bases, documents, and file system data.

The presentation infrastructure layer 23 provides services required to support the Presentation Layers (client side 22 and server side 24.). The presentation infrastructure layer 23 provides tools for building controllers and commands.

The core infrastructure layer 27 provides services required to support the business logic layer. The core infrastructure layer 27 provides tools for building manager proxies and for integrating to services.

The common infrastructure layer 25 provides services used throughout the system. The common infrastructure layer 25 provides tools that are used across the system architecture. For example, the common infrastructure layer 25 provides tools for building "Command Manager" which is used in the server side presentation layer as will as the service layer.

Use Case View of the Software Architecture

A key feature of the present invention is forward and backward traceability of data that is accessed, read or written to by the user. As data is inputted into the framework from outside databases or from an individual user, it is "tagged" a unique identifier (meta-data) that is an unintelligible globally unique string of characters that uniquely identifies that particular artifact (data). All further edits, annotations, revisions, etc. of that particular data will in turn be linked to that particular globally unique identifier, so that all data associated with a particular artifact can be traced both forward and backward in time sequence of their entries.

Another important feature of the present invention resides in the ability to set fine-grained user entitlements to artifacts, thereby indicating who has visibility or access to that data, and even more specifically, if access is allowed, whether the user that is allowed access can read and write to the data or only read the data, and controlling access accordingly. Fine-grained entitlements occur at the dossier level, as each artifact is assigned to one or more dossiers where it is accessed at the user level. Thus, data has accountability and traceability throughout the system The software architecture of the present invention is arranged such that a system administrator creates a dossier tree comprising a hierarchy of dossiers to which data artifacts can be assigned. Each dossier has defined entitlements which are assigned to it by the system administrator. Examples of various levels of entitlements are specific teams, role types that may be common to various teams and specific users. The dossier tree is created as a dossier tree page which provides a standard approach for developing a thin-client hierarchical tree view page. The dossier tree page defines a core set of components and their behaviors, and describes their collaboration in building an application.

Figure 4:
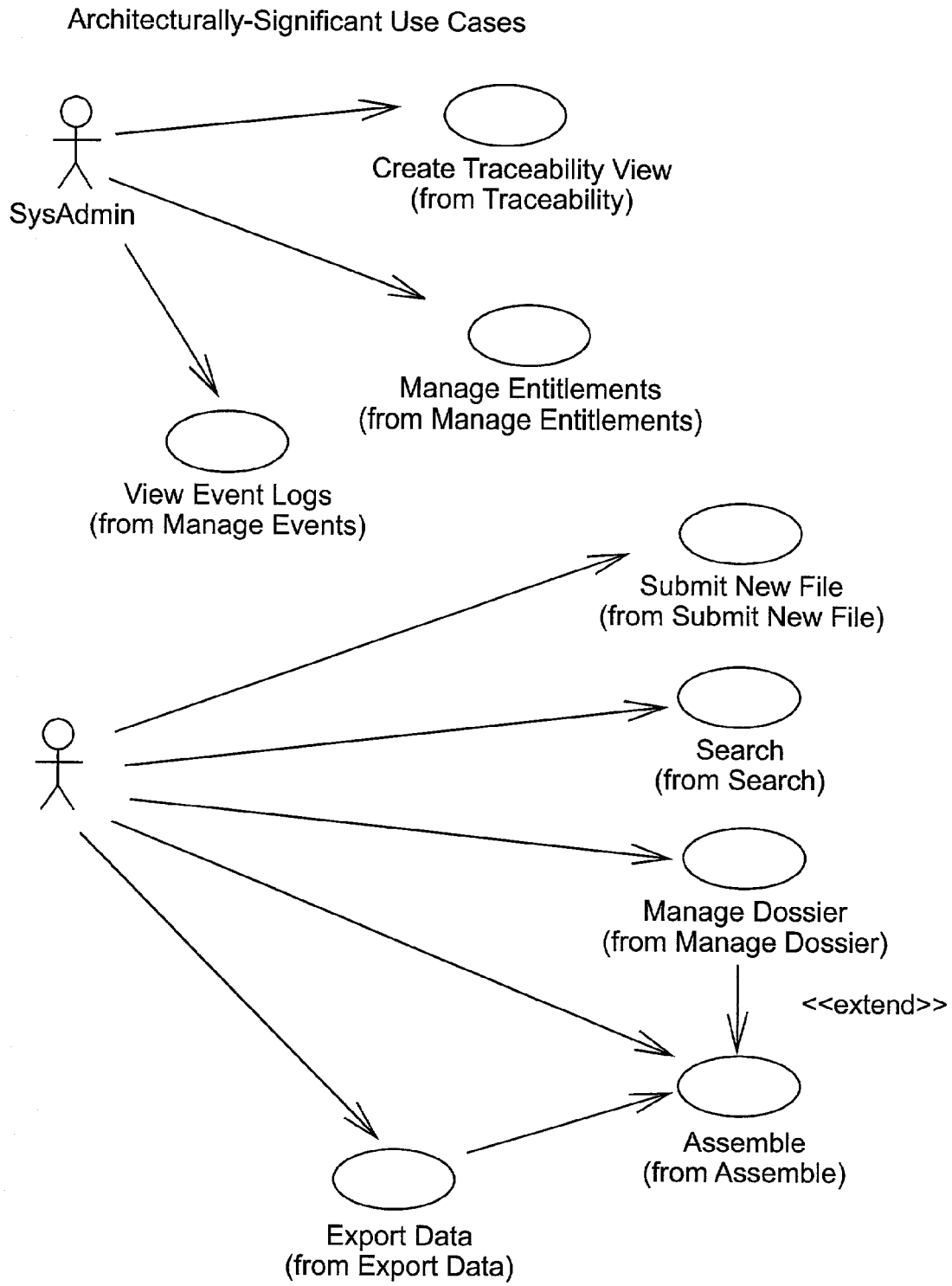
FIG. 4 is a diagram identifying architecturally significant functions available to the system administrator as well as users of the present invention in achieving fine-grained entitlements to use of the invention and secure management of data from disparate sources.

FIG. 4 is a diagram identifying architecturally significant functions available to the system administrator as well as users of the present invention in achieving fine-grained entitlements to use of the invention and secure management of data from disparate sources, including functions of forward and backward traceability of the data, importing, exporting and assembling of data into documents, use of annotations for the data of interest, searching of meta-data and personal workspace management. Major functions that are performed by the system administrator include creating traceability views 40, managing entitlements 42 and viewing event logs 44. Major functions that are available at the user level include submitting new files (data) 46, searching 48, managing the user dossier (personal workspace) 50, assembly 52 and exporting of data 54.

As an overview of these functions, the Create Traceability View use case specifies the structure and hierarchy of traceable events in the system. It identifies what events should be traced and how they should be associated and presented to the user.

The Manage Entitlements use case specifies the associations between Users, Role Types, and Dossier Types in the system. It defines the access control rules for Dossier Type for a particular Role Type/User.

The View Event Logs use case specifies what events should be captured in the system and how they should be related.

The Submit New File use case specifies the workflow for submitting a file to the system and what should happen to the file and its associated meta-data once the file is submitted.

The Search use case specifies what features must be supported for meta-data queries and result set processing.

The Manage Dossier use case specifies what artifacts are managed by the system, their meta-data composition and entitlement to users.

The Assemble use case specifies the workflow for accessing stored meta-data contained across artifacts and building output files using pre-defined templates.

The Export Data use case specifies the workflow for exporting an assembled artifact to a target workspace outside of the system boundary.

Figure 5:
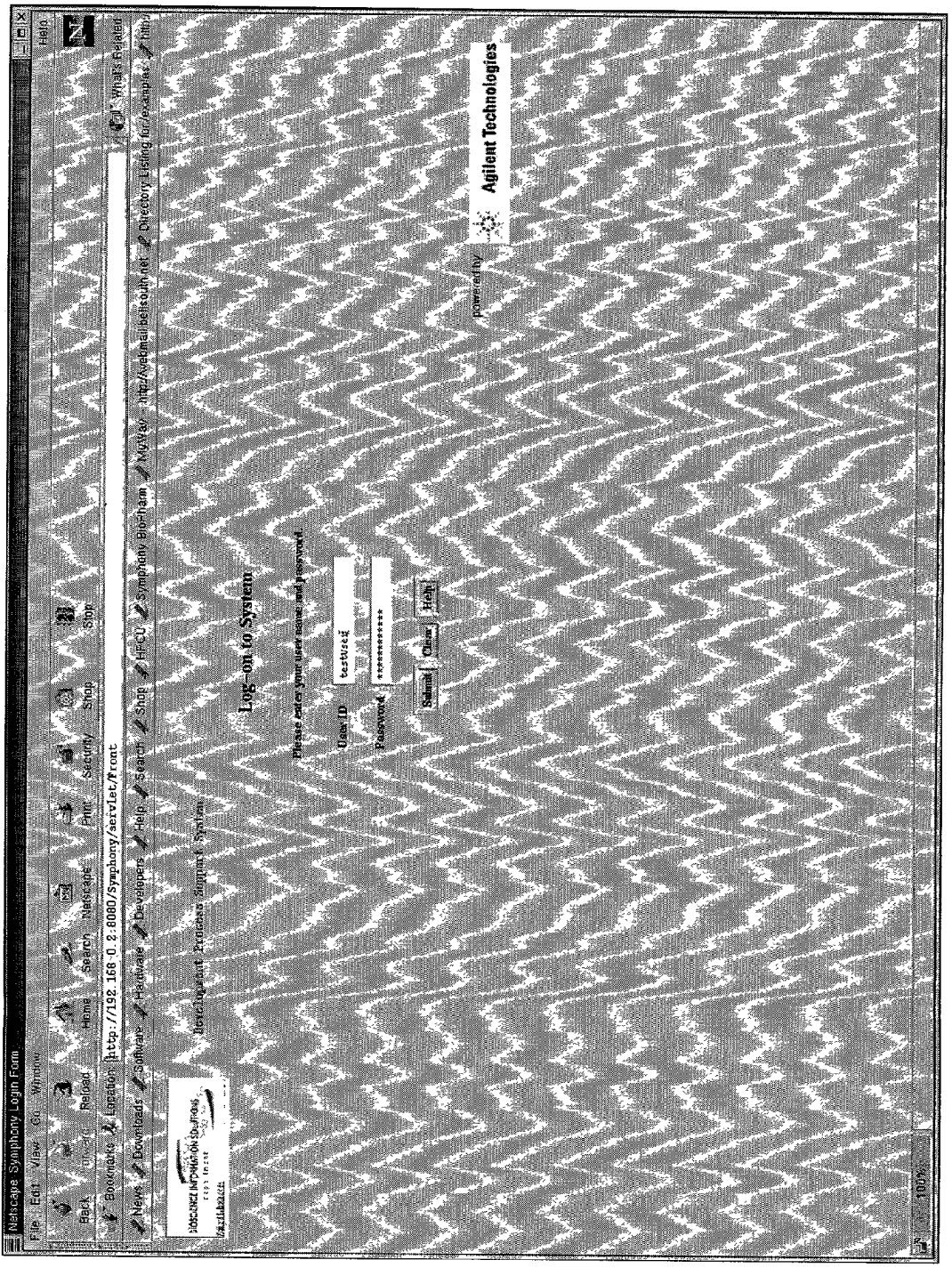
FIG. 5 is a screen print of an example of a log-on page that is displayed on the GUI of a user and which requests a User ID and Password.

FIGS. 5 through 7 and 9 through 20 are taken from a GUI of a user (or administrator, as indicated) which will be used in further elaborating on the use cases described above. In order to access the system, a user must first log on by accessing a web server and typing in the address of the HTTP server 4. The HTTP server, in response, sends back the HTML page shown in FIG. 5 which requests a User ID and Password. Once the user enters his unique UserID and Password a REQUESTID command is implemented through Front as described above. An access command is generated which sends the request to the framework server 9. That is, the UserID and Password are built into a formal request by Service 28 which communicates with the database 9 in an LDAP(lightweight directory access protocol which may be on the database server 9 or scaled to some other server) and determines, based on the result, whether or not that user is authorized to come into the system. Tables managed by the system are used by the HTTP server to determine which HTML page should be displayed on the GUI. Sun's recommended architecture (Servlet API) may be used for this function. A service entitled JAAS (Java Authentication and Authorization Service) may be used to verify the UserID and Password. If the UserID and Password match up with matched entries on a stored lookup table of authorized users, a unique unintelligible number (entitlement number or token) gets stored in a storage cell on the HTTP server 4 and is stored temporarily, only for the duration of that user session. Thus, each entitlement number is generated as a "one time use" entitlement to the system, and a new unique entitlement number is generated each time the user logs off and logs on again. If the Password and UserID do not match up with a stored matching UserID and Password, the systems send a message back to the GUI that "authorization failed". The list of users and passwords maintained by LDAP is accessible to the system administrator, who can immediately disable entitlement to any given user, thereby providing a rapid response time for maintaining security of the system.

Figure 6:
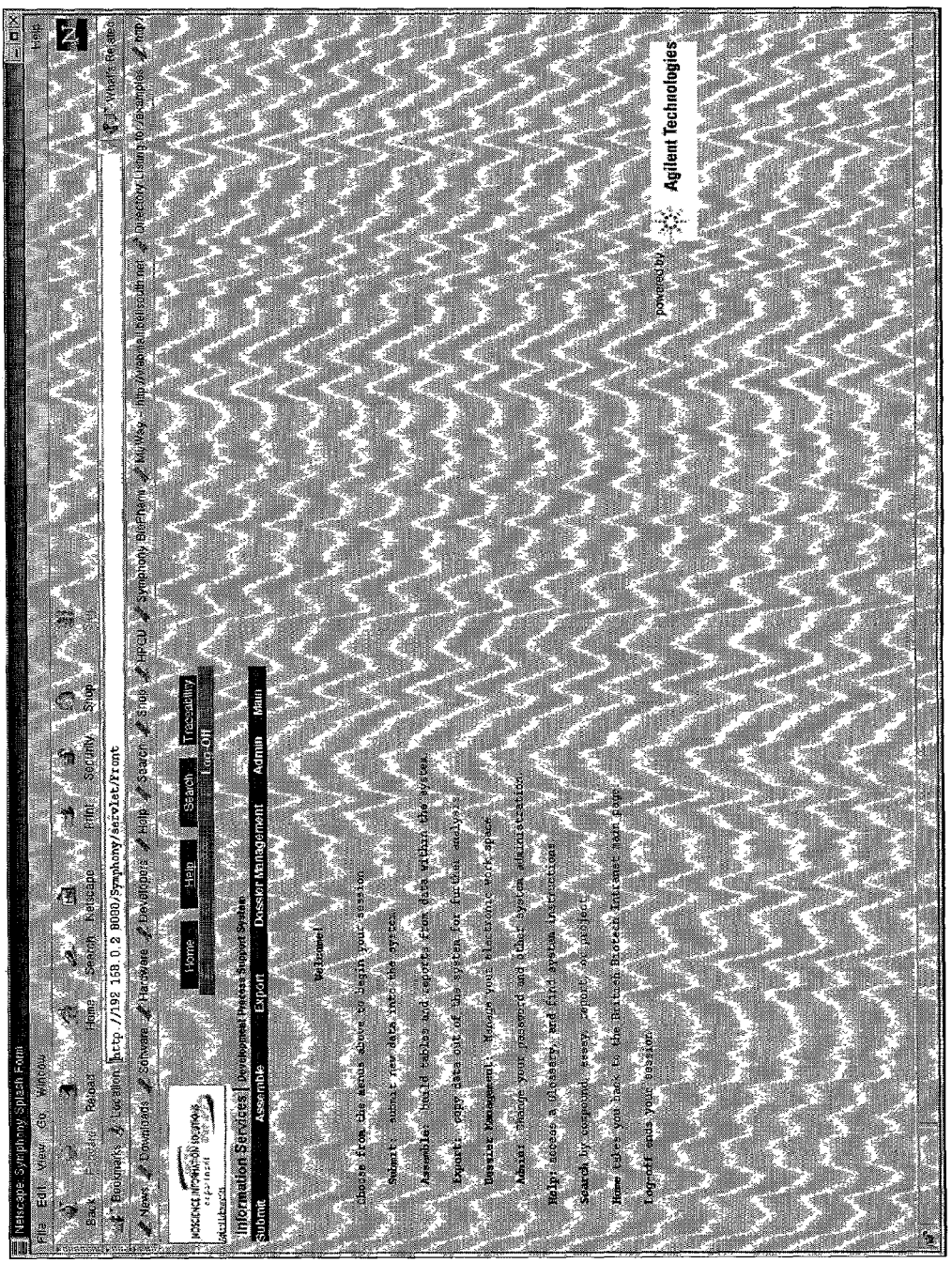

Assuming that the user has successfully logged on, a splash form or page is then displayed on the GUI in HTML format as shown in FIG. 6. The splash form provides functions on the button bar near the top of the screen which provide various functions that may be performed. The "Home" button returns the user to the screen which is shown in FIG. 6. The "Help" button goes through Front and takes the user to the back end system (server side, e.g., framework server 9) which provides a JAVA help facility (Sun Microsystems, Palo Alto, Calif.) that gives a standardized help screen with information particular to the system of the present invention. The "Search" button allows the user to perform a search on the meta-data associated with artifacts that have been collected, so as to bring a subset of all the data collected into a dossier for review of that subset of data. Selecting the "Traceability" button collects all of the events which have been generated with respect to each selected artifact, back to the first time that the data was generated (entered into the system). Events which have occurred after the particular meta-data that may have been selected and then run a "traceability" function on are also collected.

The "Submit" button initiates the submit function for putting new data into the system. The data must be "tagged out" before it enters the system, meaning that all meta-data required by a schema for that particular type of data must accompany the data at the time of submission. Examples of types of meta-data that may be included in a schema include name, source of file, description, name of creator/submitter, date and time of submittal, etc. The schema for a particular type of data which sets forth the requisite accompanying meta-data is created by the system administrator.

Figure 7:
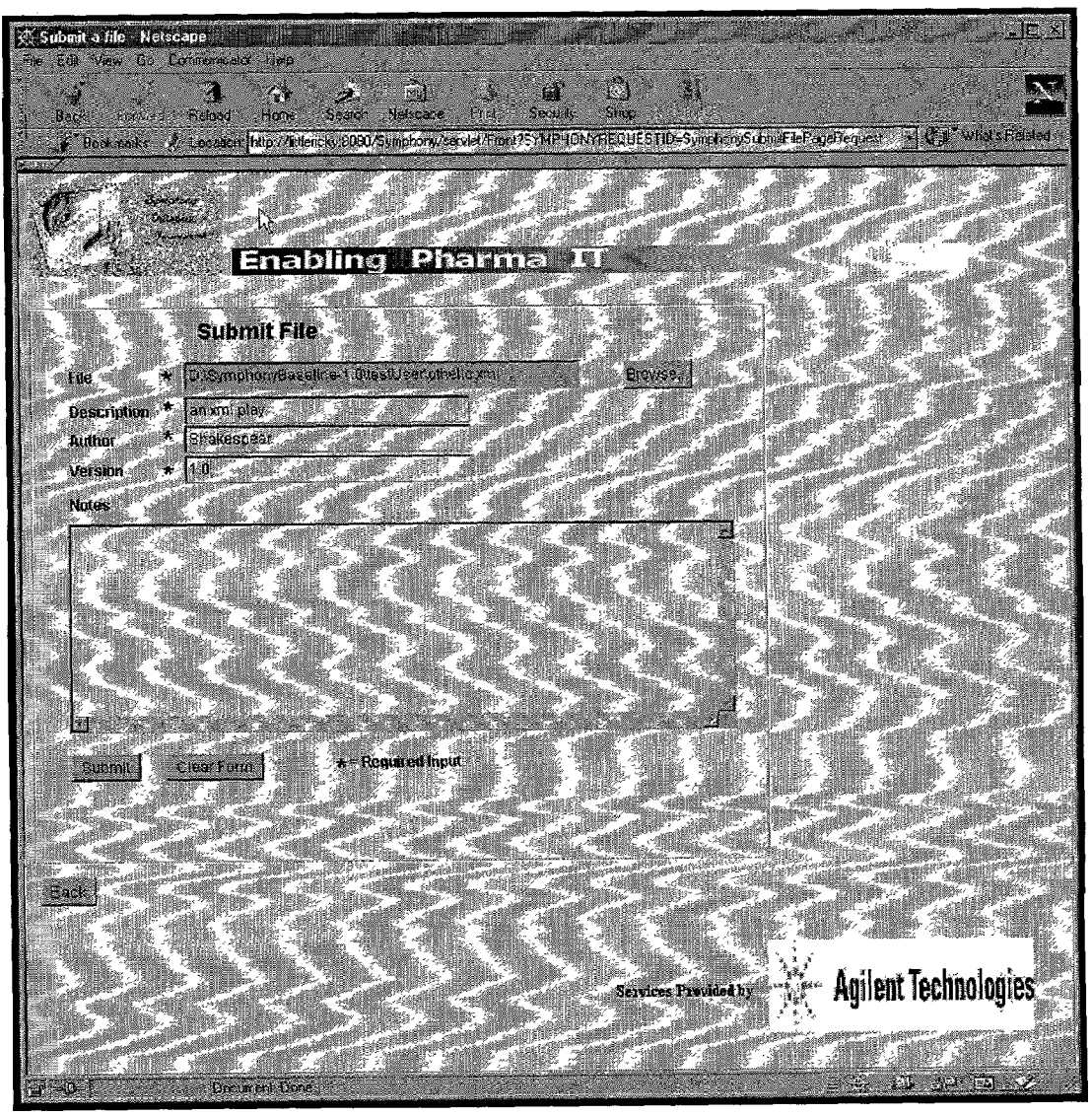
FIG. 7 is a screen print of an example of a Submit page displayed on the GUI upon selection of the "Submit" button from the splash page.

FIG. 7 shows an example of a HTML page displayed on the GUI upon selection of the "Submit" button. In this case, the entry for "File" indicates the present location of the data to be imported (i.e., the address on the user's hard drive, URL, or other location in which the system can find the data). A browse feature is provided to allow the user to browse the contents of his workstation to find the location of the data to be entered. The "Description" entry is for a brief description of the content of the data and will be stored as meta-data. The meta-data requirements for submitting new data are legal values that the user is required to submit for a particular type of file that is dependent upon the classification of the data being submitted. The requirements are inputted in the form of a schema by the system administrator, who determines the meta-data requirements that the submit page will require of the user that is attempting to input new data. The author of the data is the next meta-data component that is required by this particular screen. A version number is also required, which in the example, is 1.0. An important aspect of the present invention which provides integrity and traceability of the data managed, is that once entered, data cannot be altered. For this reason, version number meta-data is very important. For example, if a mistake was made in the original data, it cannot be changed once it has been submitted to the system. Rather, a resubmission of a new version of that data would be submitted (e.g., Version 1.1) which could then be associated in the same dossier and the changes can be viewed by comparison of the two different versions. This important aspect not only provides a verifiable traceability of all entries made with regard to any particular data, but it also prevents tampering with data once it has been entered. Further in this regard, data can not even be deleted once it has been entered in the system, but can only be marked as deleted. The data marked as deleted will still show up on the system and will also be retrieved by the appropriate searching and traceability functions. However the data will be grayed out and labeled as deleted.

All of the entries described above are required inputs for this schema. Optionally, the inputter may also write in "Notes" in the notes box, which is a free form entry that allows textual and descriptive matter to be stored along with the other meta-data. The same rules apply to "Notes" with rega note once it has been entered.

Once the Submit File form has been completely filled in by the submitter, the submitted clicks on the "Submit" button, which submits the contents of the Submit File form to Front. If any entries required by the schema have not been completed, or have been incorrectly inputted, the submission fails and an error message is printed on the GUI, directing the user to the particular items that need correction. Upon reaching Front, Front ensures that the entitlement token is valid and routes the contents of the Submit File to the appropriate processor which presents the contents in an appropriate format to the framework database 9.

A unique identifier (e.g., string of numeric characters) is assigned to the new data submission, and is permanently associated therewith along with a URL which is the address of the server (e.g., FTP server) that the data will be sent to for storage. Any annotations or additional meta-data submitted at a later time with regard to the same data will also be associated with that unique identifier, which is also referred to as a "primary key". A message is then sent through Front, notifying the user (through the HTTP server 4) that the new data file has been successfully submitted and also identifying the unique identifier to the user. An applet application on the client side (user's workstation) receives the unique identifier and address that the data is to be submitted to from the HTTP server 4, and then sends the data file (by FTP) to the FTP server where it is stored. When the file is FTP'd to its storage location, an event is generated and a file submission agent runs rules against the file to check for viruses, check for appropriate schema and the like. The event is stored in the system and used in generating traceability reports. Since the actual data may be stored at any number of remote (e.g., FTP) locations, the present system can remain much more compact, as it stores only the meta-data associated with the actual data, and enables the user to easily locate the actual data, which is often very voluminous.

The framework server 9 uses a service titled "Persistence", which is a class library in an Oracle database, for example, to grab the information submitted and uses the information to generate a new row in each of primary and secondary tables in conjunction with the primary key, the tables being stored in the framework server 9 and used to track the data and meta-data.

FIGS. 8A and 8B are schematic representations of primary 90 and secondary 92 tables used by the system to track data and meta-data. Upon submission of new data, the system assigns a unique identifier (primary key) to that data, as described above. At this time, a new row is also entered into the Primary Table 90 (FIG. 8A) to store the value of the primary key in the first column of that row. The second column of that row stores the address or location of the data. In this way, the data itself need not be stored on the framework server 9, but can be located in any number of locations, servers, etc. across the internet or within proprietary databases or intranets. The Primary Table 90 merely stores the address of that data, so that, knowing the unique identifier of the data, the system can find the location of the data and retrieve it.

The system further creates a new row of information in the Secondary Table 92 (FIG. 8B) for each instance of meta-data associated with the new data having been submitted. Each instance of meta-data is assigned a primary meta-data key, which is unique to that instance of meta-data, in the first column of the secondary table. The "type" of meta-data is also stored (e.g., description, author, version, notes or the like) and the "value" of the type is also stored. For example, the value of the author type of meta-data in the example shown in FIG. 7 would be "Shakespeare". Further, a foreign key, which is identical to the primary key of the data with which that instance of meta-data is associated, is stored in each column, which provides a pointer to the information in the primary table that is stored regarding the data with which the meta-data is associated. Once tabulated as described, the new data is referred to as an artifact.

FIGS. 8C, 8D, and 8E are schematic representations of a secondary or Meta-Data Table 92, and corresponding Meta-Data Tableau 94 and Inverted Meta-Data Tableau 96 that are used in searching the meta-data. Upon submission of new data, the system assigns a unique identifier (primary key) to that data, as described above. In the example shown in FIG. 8C, the new data was assigned a unique identifier of "123" which is then used as the foreign key for each of the meta-data entries extracted from the new data file and stored in the Meta-Data (Secondary) Table 92. Primary meta-data ID's of "1", "2" and "3" have been assigned to each of "MELTING_POINT", "FREEZING_POINT" and "EVAPORATION_POINT", respectively. The corresponding values of each type of meta-data are stored in the value column as described above.

For each entry to the Meta-Data Table 92, a Meta-Data Tableau 94 in the meta-data management facility (meta-data manager) of the framework s as shown in FIG. 8D. The Meta-Data Tableau 94 comprises a column for each type of meta-data that is stored with regard to a data file, and stores the values of each of these types in a single row corresponding to the primary key of the data. FIG. 8D shows the entries for the meta-data corresponding to primary key "123" from FIG. 8C, and also includes information with regard to two subsequent data files corresponding to primary keys "124" and "125", respectively.

Still further, the meta-data manager inverts the Meta-Data Tableau 94 and maintains a resultant Inverted Meta-Data Tableau 96 as shown in FIG. 8E. In this way, each column of meta-data values becomes a vector useful in optimizing searching in multiple dimensions. In order to search for data, a search specification (e.g., an XML search specification) is created on a search page at the GUI. The search specification is based on parameters selected from the first column in the Inverted Meta-Data Tableau 96. For example, an XML search string used to search for data closest to a specified melting point of 119 and a specified evaporation point of 220 would have the following format:

```
<META_DATA_SEARCH>
<SEARCH_SPEC>
<MELTING_POINT>119</MELTING_POINT>
</SEARCH_SPEC>
<SEARCH_SPEC>
<EVAPORATION_POINT>220</EVAPORATION_POINT>
```

-continued

```
  </SEARCH_SPEC>
</META_DATA_SEARCH>
```

Note that all fields are not required for the search, and that the values specified do not have to exactly match any of the actual values stored. In the example shown, the XML search string is next transformed to a search vector and a name vector as follows:

float [ ] search_spec={119, 220};
String [ ] names={"MELTING_POINT", "EVAPORATION_POINT"}.

Upon performing the search, a difference variable is calculated for each search point using the Inverted Meta-Data Tableau 96 row for the corresponding name being searched, and a statistical distribution of the data is generated, so that at minimum, one matching point is returned. One example algorithm for calculating a difference variable is described in detail in S. Nene. "A Simple Algorithm for Nearest Neighbor Search in High Dimensions", IEEE Transactions on Pattern Analysis and Machine Intelligence, vol. 19, no. 9, September 1997, which is incorporated herein, in its entirety, by reference thereto. It is noted however, that the present invention is not limited to any particular algorithm for calculating a difference variable, as other known algorithms could be substituted for the identified algorithm.

In this way, a list is returned for each variable searched and each list contains at least one point (identified by its unique identifier) for each variable searched. Each list is then compared and where a unique identifier is present in each list the data (identified by the unique identifier) is returned to the user.

Using the difference variables, a similarity search of the Inverted Meta-Data Tableau 96 is preformed for all values falling within the range defined by the specified search value plus or minus the difference variable value. That is, for each name in the name vector search the inverted tableau row corresponding to that name is searched for values such that the value in the table 96 falls within the search specification value plus or minus the difference variable for the row. The foreign key of each hit is stored in a vector by type (i.e., name) searched (e.g. "MELTING_POINT"). A solution set is created in this way, which is a vector of matches. Using the foreign keys in the vector, the data files containing the matching values can then be retrieved.

Referring back to FIG. 6, if a user selects "Dossier Management" the framework server 9 checks the entitlement of the user in the LDAP (the entitlement of the user is set by the system administrator, as described below) to determine which dossiers in the system that the user is entitled to see. It may be the case that the user is entitled to read only some dossiers while being permitted to read and write to other dossiers. Still further, the user may have no access to some dossiers. All of this is dictated by the entitlement which is defined for the particular user by the system administrator. The framework server, after determining the entitlement of the user, sends back the information through Front and to the HTTP server which is needed to generate the dossier management screen shown in FIG. 9. That is, the information with regard to each accessible dossier is retrieved from an Oracle database and the HTTP server builds a dossier tree using this information.

Although not shown, when a particular dossier is selected in the left window by the user, the right window becomes populated with all of the meta-data associated with the artifacts that have been assigned to that dossier. If the user has read only privileges to that dossier, the meta-data will appear in a "grayed out" font. Otherwise the meta-data shows up in full black (or other color) text cannot alter the meta-data that already exists, but can only add annotations. Modified data or new data must be submitted by using the submit procedure described above, and such modified data or new data will be assigned a new primary key. Annotations, however, can be written directly and associated with an existing data primary key. In this way, the integrity of the database is assured. New submissions by users with write capability are simply added to the meta-data compilation in a sequential fashion.

Figure 9:
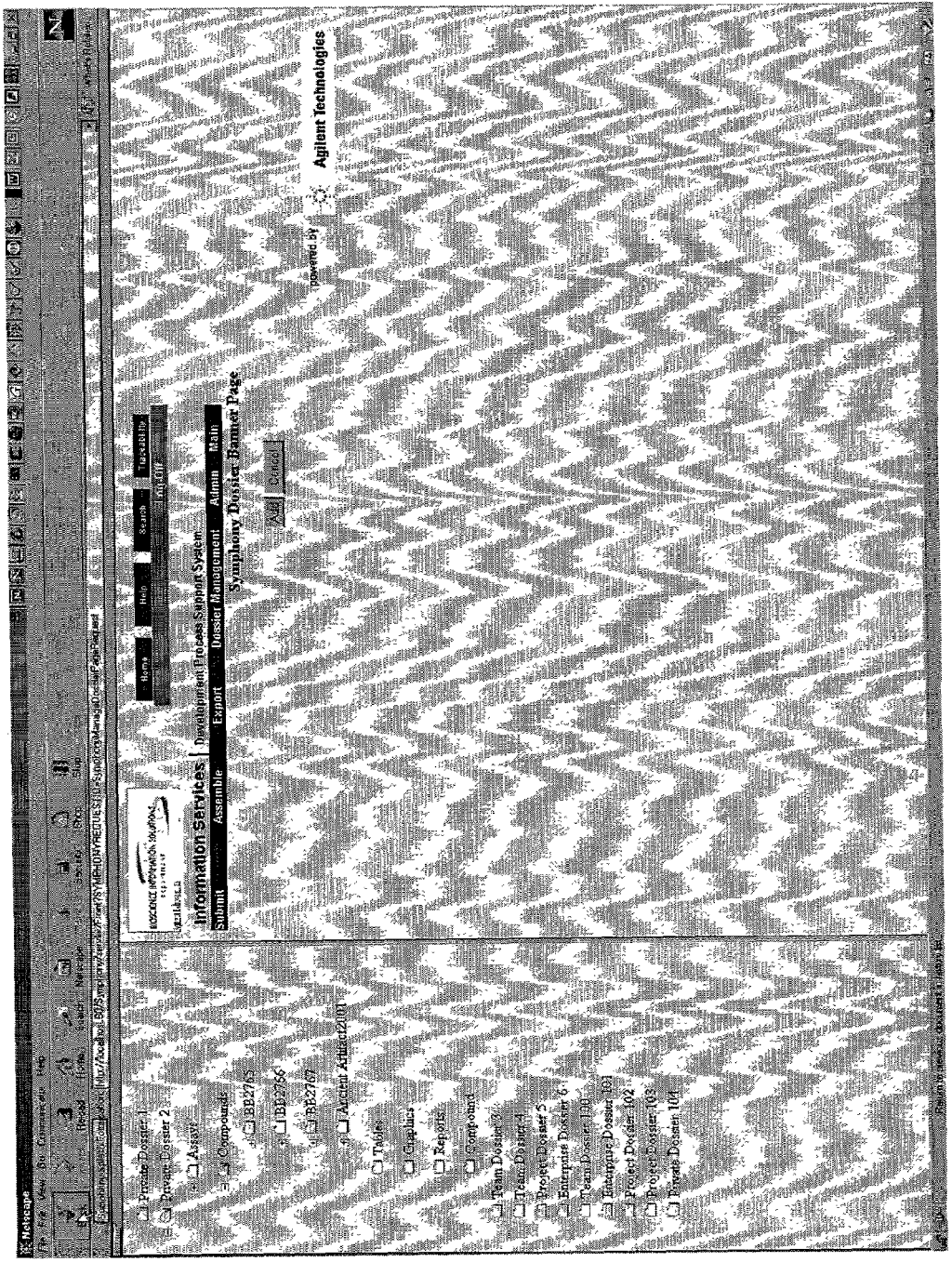
FIG. 9 is a screen shot of an example of a dossier management screen that is generated when a user selects the dossier management function in FIG. 6.

Going back to the example of the new data submission (FIG. 7), when the user who submitted the new data goes to the manage dossier screen of FIG. 9, the new artifact resulting from the new data submission will initially be catalogued in the user's default dossier, which is a private dossier that is permanent and cannot be deleted by the user. The default dossier is used as the default location for placement of new data (artifacts). The user can than access the default dossier, locate the new artifact, and move it to the appropriate dossier into which the new artifact is to be classified.

An additional feature available to the user in this mode is the ability to create a new dossier and put new data files in that dossier. The user may create a new private dossier or any other type of dossier to which he has been entitled in the LDAP.

Another feature available to the user is the ability to assemble data within the system into a predefined template or report. This feature is particularly useful for the submission of reports having standardized requirement, such as in the generation of an Investigational New Drug to the FDA (or CTX to the EU), for example. In addition, the stringent requirements of such agencies, include traceability to the source of data supporting decisions to continue a compound forward. Such traceability is provided by the present invention's ability to tag all of the data from its inception and track that data sequentially with the meta-data that is associated with it.

When a user is ready to assemble data, a selection of the "Assemble" function (FIG. 6) is made. Assemble is generally used to accumulate smaller-grained data into larger grained data format, e.g., in the form of a table. A tree structure appears in the left hand pane of the GUI, representing a selection of templates (e.g., monthly reports, tables, specific FDA forms, etc.) from which the user can choose. Upon selection of the desired template, the left hand pane of the GUI displays the dossiers that are available to the user and the right hand pane is divided among top and bottom panes. The top pane contains the template, which again is a structured form into which data is to be inserted. For a simple example, the top pane may include three columns, one labeled "compound number", the second labeled "name of compound" and the third labeled "mouse data". With each selection of a row of the template, the user can select a dossier (in the left hand pane) from which he desires to extract data. Upon selection of a particular dossier, the data from that dossier appears in the lower right hand pane. Following the simplified example, the data from the dossier may include many rows of data, each of which includes compound number, compound name, and mouse data. The user can select any particular row that he/she wishes to enter into the table and click on a select button which moves the data into the table. Upon moving to the next row in the table, the user can either stay in the same dossier or select another dossier and proceed in the same manner described above. The templates can, and generally do, specify the formatting of the data which can be accepted into each column entry. For example, a column may require only integers, in which case it would not accept data in decimal format. This provides an additional check that the appropriate data is being placed in the appropriate locations of the table.

When the table has been completed, the table itself is saved as a new artifact, which is processed like a new submission of data, as described above. Thus, the completed table also receives a unique identifier and is tied into the system for traceability. This artifact will also appear initially in the user's default dossier, and the user can then reassign it to an appropriate dossier, as described above. In a situation where the user wishes to temporarily stop work before completion of the table, that table is saved as "work in progress" in the private dossier of the user. If the table was incomplete at the time of saving, it is stored as "work in progress" and can be returned to by the user and completed at a later time. If the table is stored as "final", it is treated just like all other artifacts on the system and cannot be altered or added to.

After the assembly of data has been completed, the user has the option to export the created artifact outside of the system. Choosing the "export" function allows the user to print or FTP the selected artifact. Thus, the user can export the table or other artifact to his local drive by FTP and then use the file to import to an Excel spreadsheet, Word document, or the like, for example. The assembled data is ordered so that the data within it can be easily imported into an Excel spreadsheet or Word document to generate a report from it.

The Search function (FIG. 6) allows an entitled user to search for tagged data within dossiers that the user is entitled to. Boolean operators may be used to assemble a search query to search for traceable artifacts, components of traceable artifacts or annotations associated with traceable artifacts. For example, select a "dossier type" from choices including "Default", "Enterprise", "Project" and any other type set up by the system administrator and to which that user is entitled, and from the data and meta-data associated with that type dossier (which may include a number of dossiers), perform a search for any data or annotations updated by a particular author. This is only an example, as any of the "tags", i.e., meta-data, may be used as search criteria, and at any dossier type (which vary in scope, as described below) to which the user is entitled. Another example would be a search of project dossiers to identify all data by a particular author within a defined date range and which are PDF files. Obviously, the more meta-data that is required in the schema for data entered in a dossier, the more flexibility and precision in defining searches using the meta-data. A search engine may also be provided for searching key words in the annotations and descriptions meta-data.

The traceability function (FIG. 6) creates a complete history (both backward and forward in time) of all events that have occurred with regard to a selected artifact. Every time something is done within the system with regard to an artifact, an event is generated and an event manager stores the event in the system on the Oracle database of the framework server, such that the event is linked to the unique identifier of the artifact. A time stamp is also stored with each event to identify the chronological time in which it was generated. All of the identifying data for the event is stored as an XML string. Thus, as described above, when new data is first submitted, an event is generated, which stores meta-data regarding who submitted the data, when it was submitted, who the author is, the description and version of the data, and any other required meta-data in the schema. Further, when a user uses or accesses that artifact and writes an annotation to it, another event is generated, taking note of when the annotation was made and by whom and linking it to the unique identifier of the artifact. The system may, optionally, even be set up to generate an event each time a user merely reads an artifact, even if the user has read only capability of that artifact/dossier. Likewise, when the artifact is used during an assemble, or is otherwise exported, and event is generated and linked to the unique identifier of that artifact. If the system administrator changes the UserID, Password, address, or any information with regard to an author or other person currently linked to the artifact, an event is generated and linked to the unique identifier of the artifact. Further, as noted above, and entries that generated an event and which have since been marked for deletion will still be identified in the traceability report, with an appropriate flag that the data, meta-data or annotation has been marked for deletion.

Figure 10:
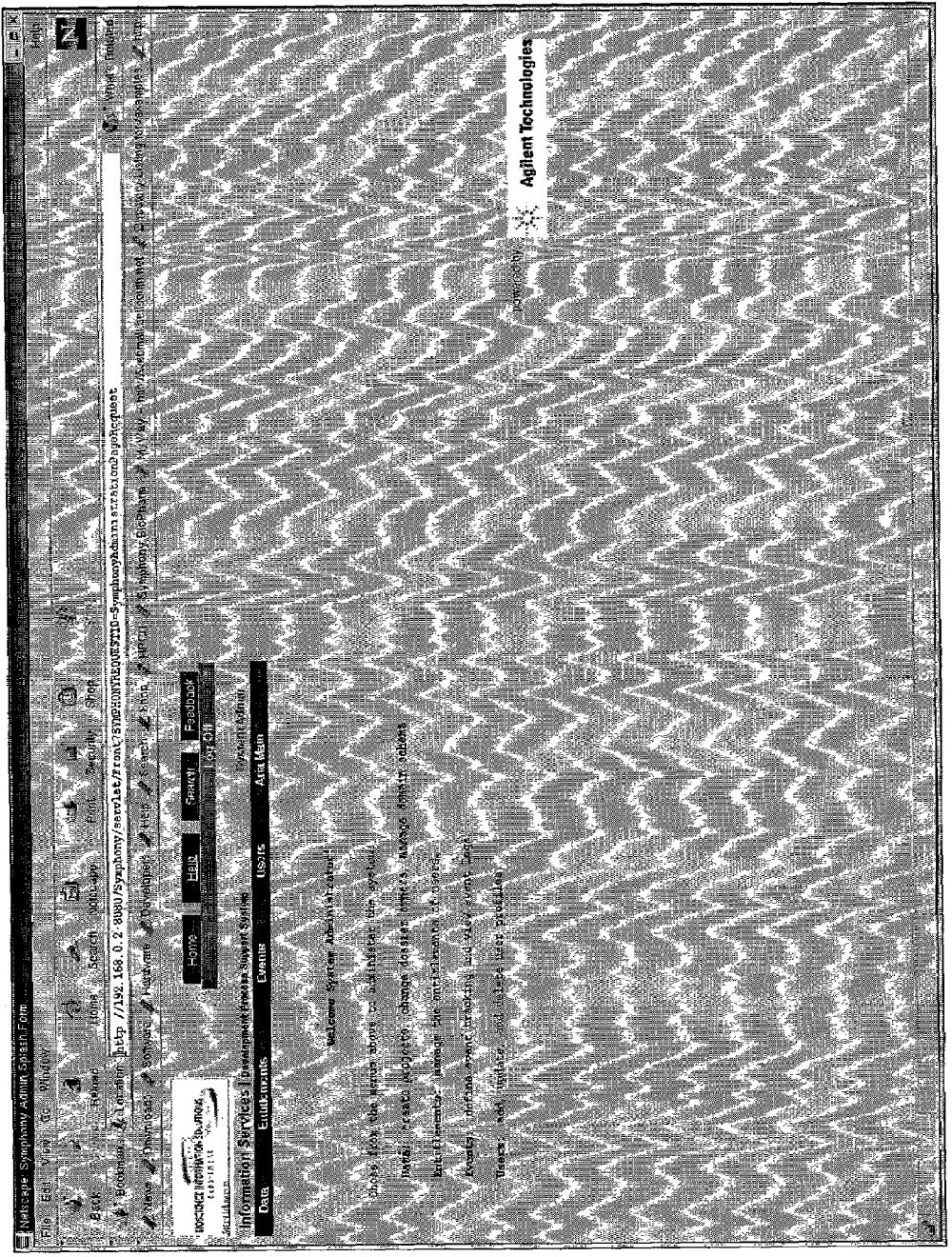
FIG. 10 is a screen shot of an example of an Admin page that is available for the system administrator to sign on to perform various functions.

The traceability feature is particularly important for responding to the FDA, for example, or in any other report where the entity reported to requires a complete verification of the data gathered and its history from time of entry into the system. By selecting which artifact should be traced, (i.e., by selecting the unique identifier of the artifact to be traced) all events with have been generated, and hence, linked to that unique identifier are produced in chronological order, giving a complete history of who entered the data and when and as to how the data has been further developed, used, commented on, revised, etc. up to the time that the traceability report is produced.

referring now to FIG. 10, an Admin page is shown that is available for the system administrator to sign on to for the performance of functions such as those briefly described with regard to FIG. 4 above. Functions on the button bar of this screen, such as Home, Help, etc. perform in like manner to those described above with regard to the splash page/form. By selecting the "Data" function, the system administrator may create new projects, change dossier owners and manage domain schema. The "Entitlements" function allows the systems administrator to set up, change and delete user entitlements to the system. The "Events" function allows the system administrator to define what actions should generate an event and also allows viewing of event logs that are generated according to the events defined. The "Users" function allows the system administrator to add, update/revise and delete user profiles.

Figure 11:
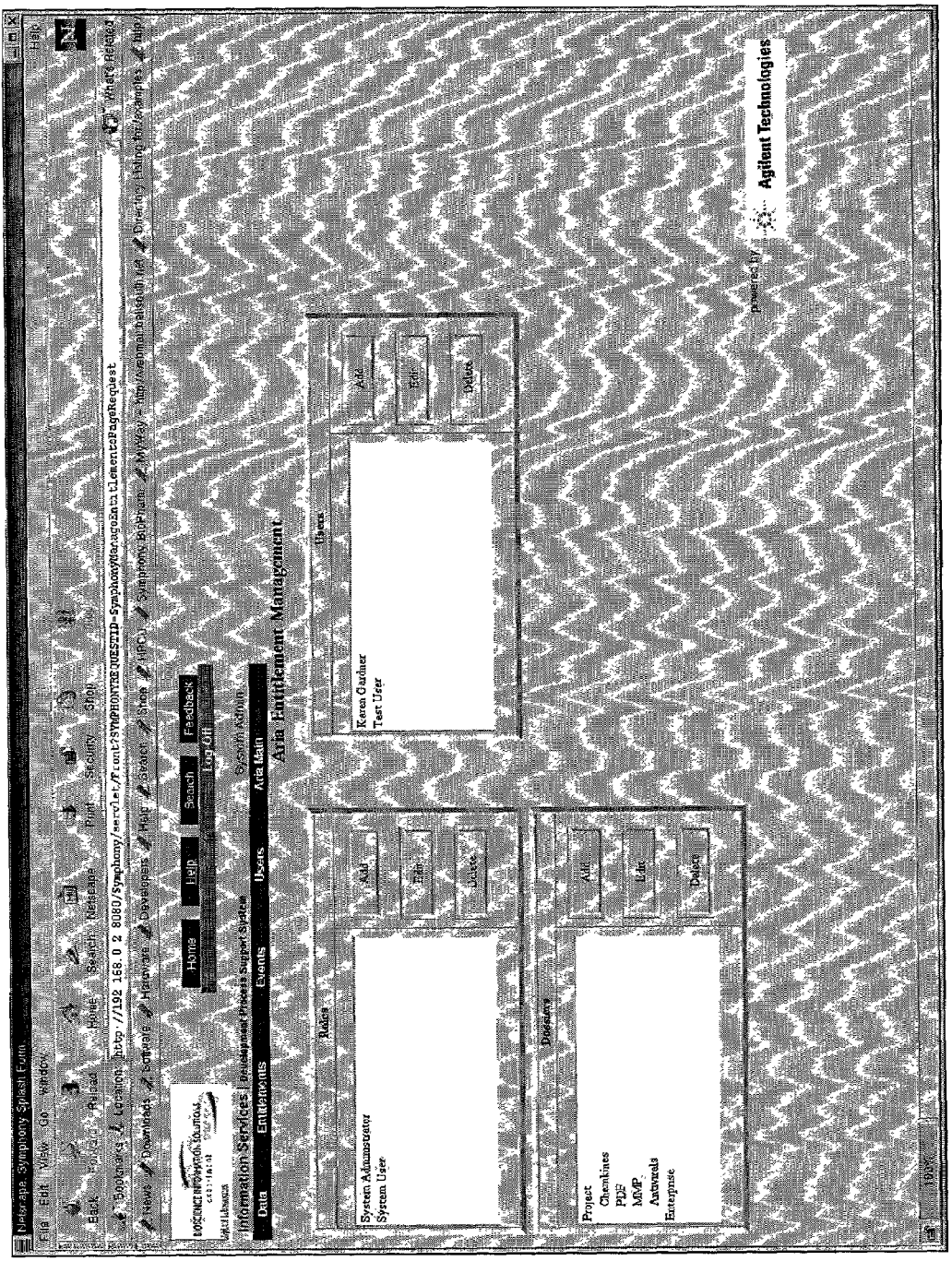
FIG. 11 is a screen shot of an example of FIG. 11 is a Manage Entitlements screen that is generated when the system administrator selects "Entitlements" from the Admin page.

FIG. 11 is a representative screen that is generated when the system administrator selects "Entitlements" from the Admin page. All Roles have a common life cycle, and only the system administrator can add, edit or delete a Roll or a User by editing the appropriate pane (titled "Roles" and "Users", respectively) on this screen. If a User is deleted, the User is marked "inactive" and that User can no longer access the system, effectively immediately upon such marking. All of that User's data, meta-data, annotations, and the like, however, are maintained on the system in order to maintain a complete record, reliable traceability, etc. If a Roll is deleted, it no longer shows up in the system. In the "Dossiers" pane, the system administrator can create a new Project and configure dossiers according to type, as well as set up the entitlements for access to the dossiers.

Figure 12:
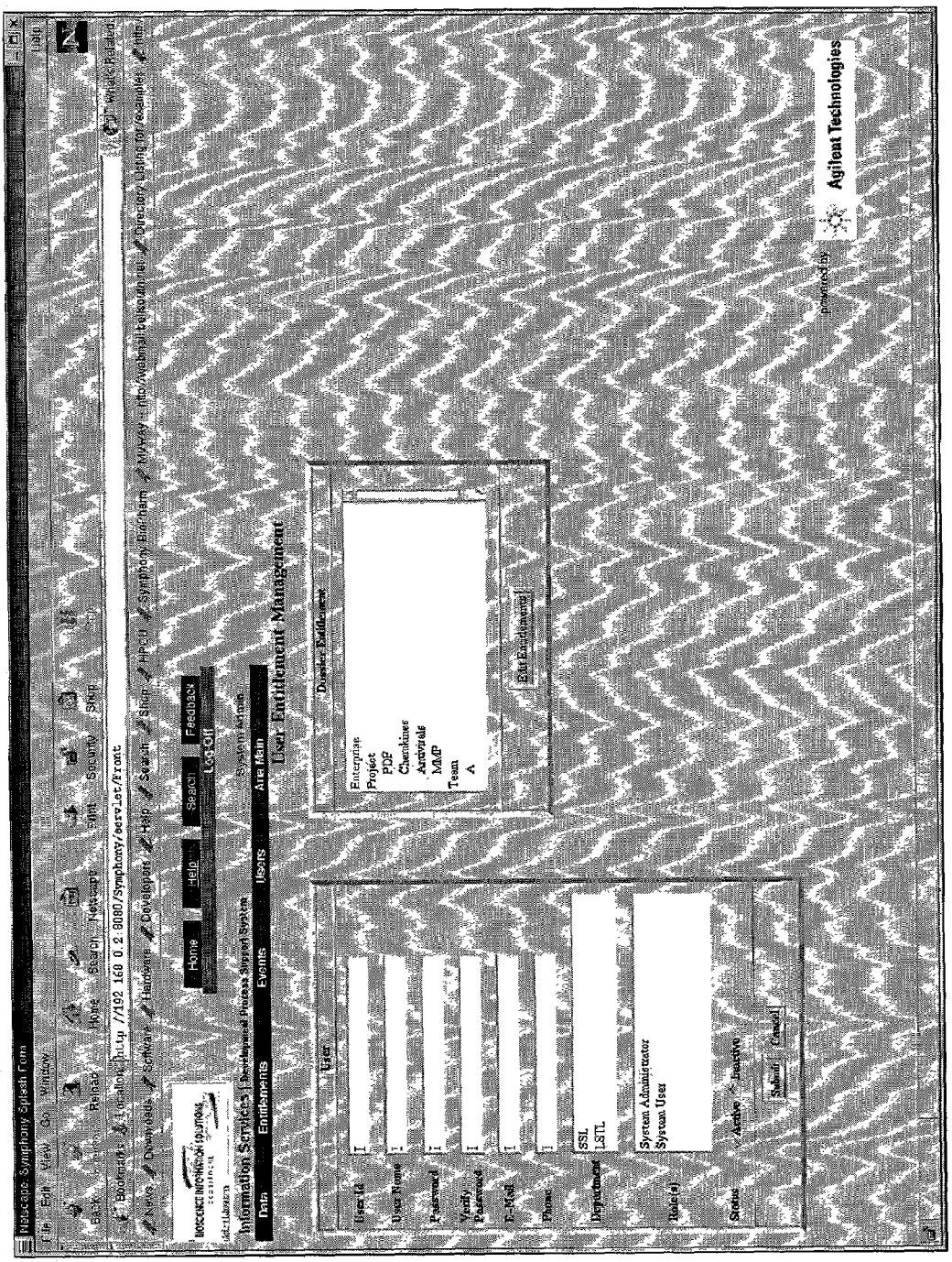
FIG. 12 is a screen shot of an example of a User Add page which is generated on the GUI by selecting the "Add" button in the "Users" pane of the Manage Entitlements page.
Figure 13:
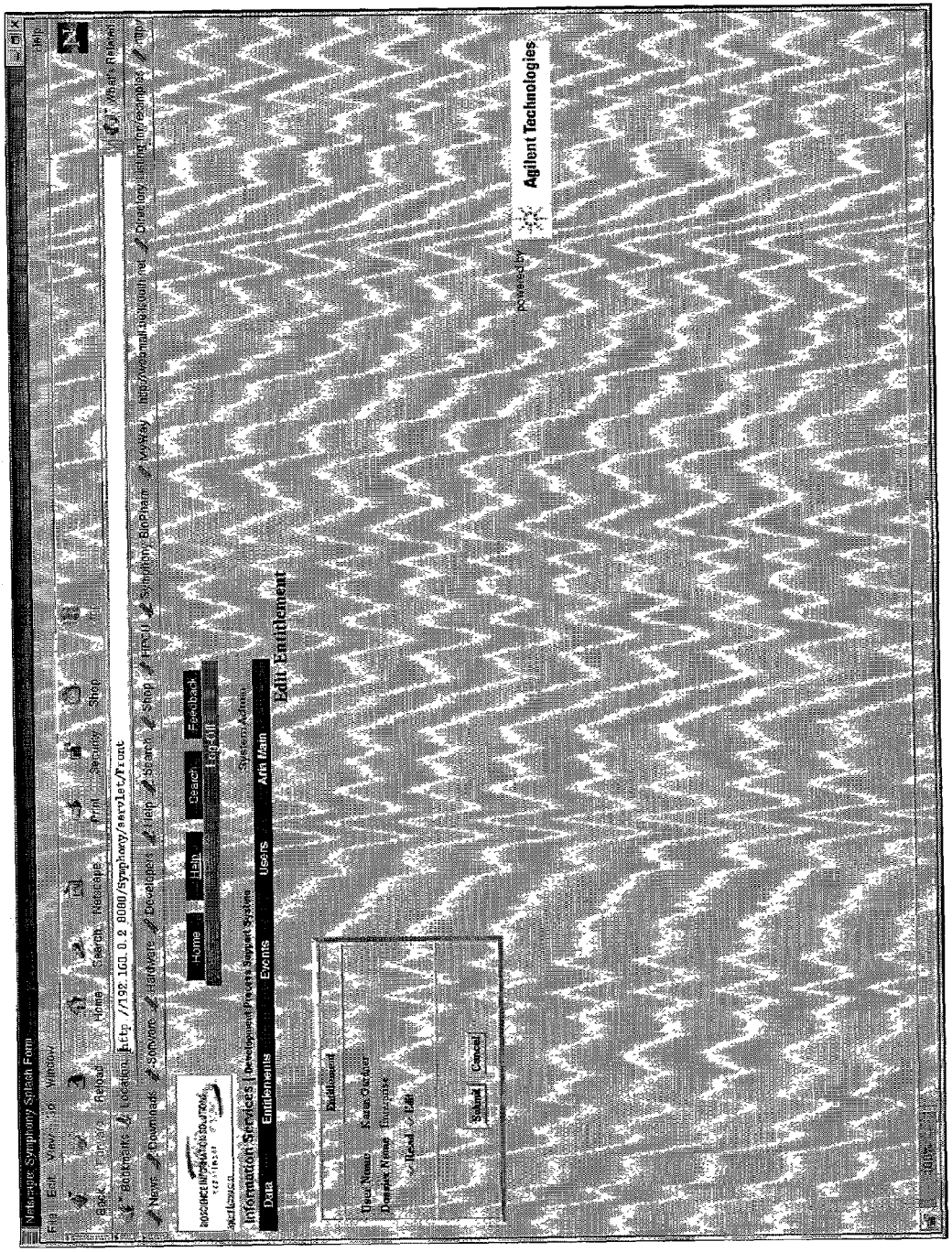
FIG. 13 is a screen shot of an example of an Edit Entitlements page which is generated when selecting the edit entitlements function from the right pane of the Manage Entitlements screen.
Figure 14:
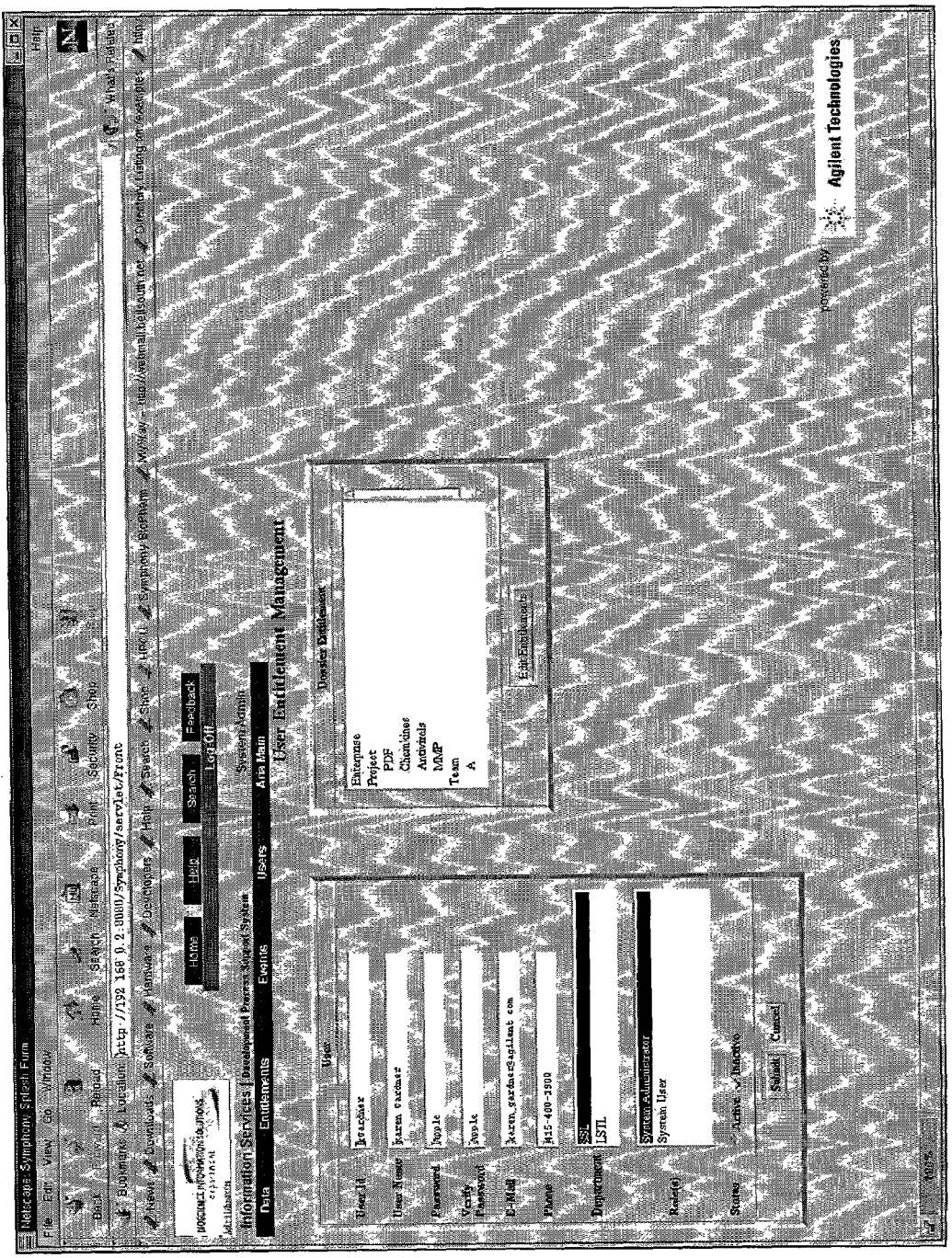
FIG. 14 is a screen print of an example of a User Edit page which is generated by selecting a user in the User pane of the Manage Entitlement page and then selecting the "Edit" function in the pane.

By selecting the "Add" button in the "Users" pane, a User Add page is displayed on the GUI of the system administrator as shown in FIG. 12. The left pane of the page prompts the system administrator to enter specific information about the user who is to be added, e.g., UserID, User Name, Password, Verify Password, E-Mail address, Phone, Department, Role(s) and Status. The system administrator generates and assigns the User ID and Password, as well as the Roles which that particular user is to assume. The status may be left inactive until an appropriate "starting date" at which time the system administrator can revisit this screen and change the status to active.

The right pane allows the system administrator to select any of the existing dossiers to which the particular user is to have entitlement. After choosing the dossiers which the user is to have entitlement to, the system administrator can select "Edit Entitlements" which will take the administrator to the "Edit Entitlements" page (FIG. 13) Note, that the default entitlement is 'administrator does not access "Edit Entitlements" to positively sign an entitlement to a User, the User, by default will have no entitlement. In the Example shown in FIG. 13, the User has entitlement only to "Enterprise" type dossiers, which are certain shared types of dossiers that outside vendors are allowed access to, and which are exclusive of Project, Team, and other proprietary dossiers. However, this is only an example, and entitlements can be edited in the same manner to any dossiers that appear in the "Entitlement" pane of FIG. 13. For each dossier listed there appears a "read" check box and an "edit" (i.e., write) check box. If the system administrator wants to restrict the user to read only entitlement, then only the read box will be checked off for that particular dossier type. If read and write access is to be assigned to the user, then the edit box will be checked off (which automatically also checks off the read box if it has not already been checked off). Once all of the entitlements have been properly edited, the submit button is selected, which returns the system administrator to the User Add page (FIG. 12). Assuming that all of the User information has been appropriately supplied, the system administrator then selects "Submit" from the User pane, and the User is then newly added to the system, according to the processes described above, with regard to assignment of a unique identifier, generating of an event, as well as updating the user and entitlement tables.

By selecting a user in the User pane of the Manage Entitlement page (FIG. 11) and then selecting the "Edit" function in the pane, a User Edit page is displayed to the system administrator (FIG. 14) This page functions very similarly to the User Add page (FIG. 12) described above, only the information in the User pane is already filled in and is being accessed to make changes. A Dossier Entitlement pane is also included where the system administrator can add, delete or change the dossiers, types or sublevels of types that that user is to be entitled too. Again, the "Edit Entitlements" button can be selected to take the administrator to the page on FIG. 12, if it is desired to change the level of entitlement of any particular dossier to which the user is entitled. As noted above, anytime the User information is changed (e.g., user changes department, gets a new phone number, changes password, is made inactive/active, or dossier entitlements change) an event is generated which is tracked by the traceability function for all artifacts that are associated with this user.

Figure 15:
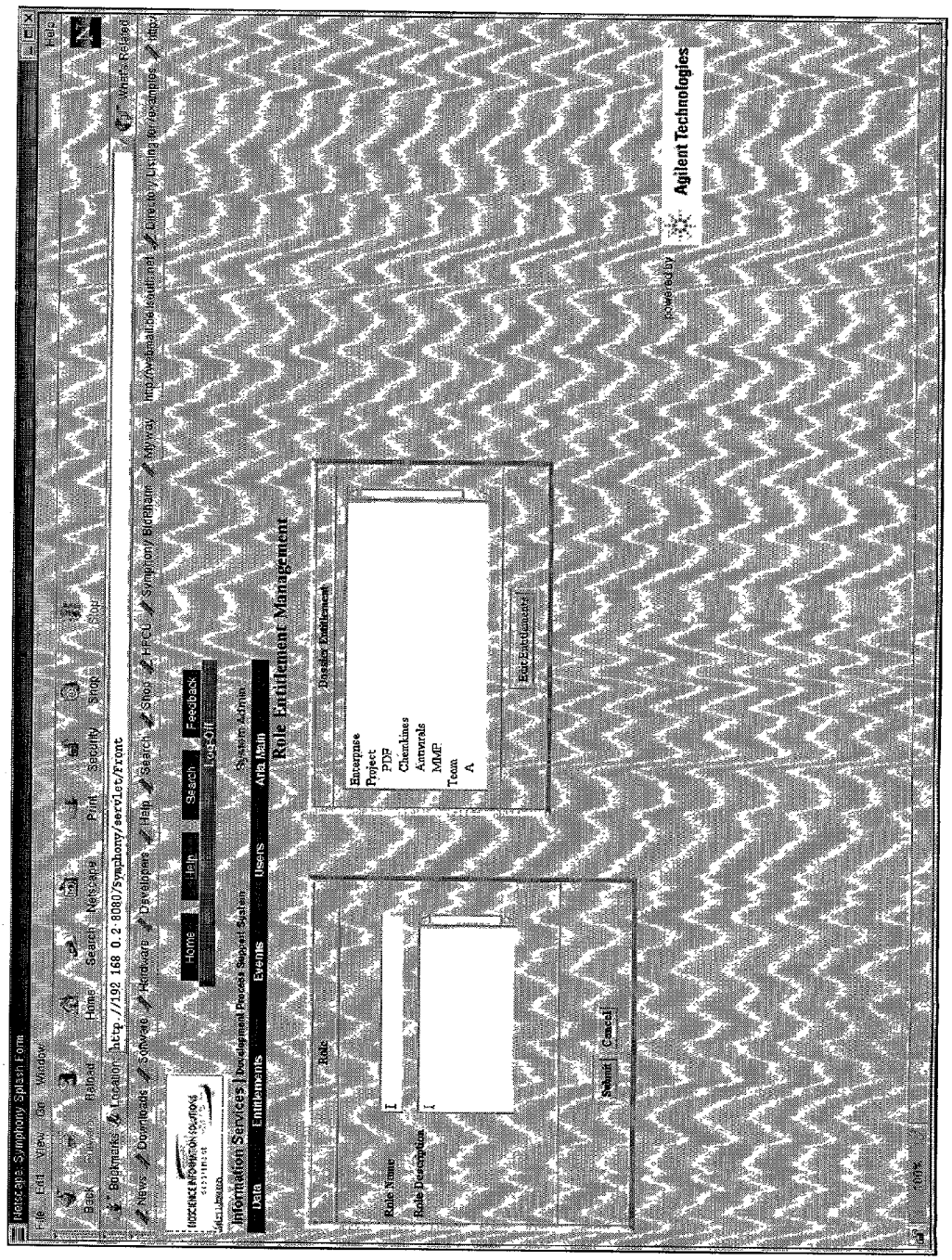
FIG. 15 is a screen print of an example of a Role Add page that is generated when an administrator selects "Add" from the "Roles" pane of the Manage Entitlement page.
Figure 16:
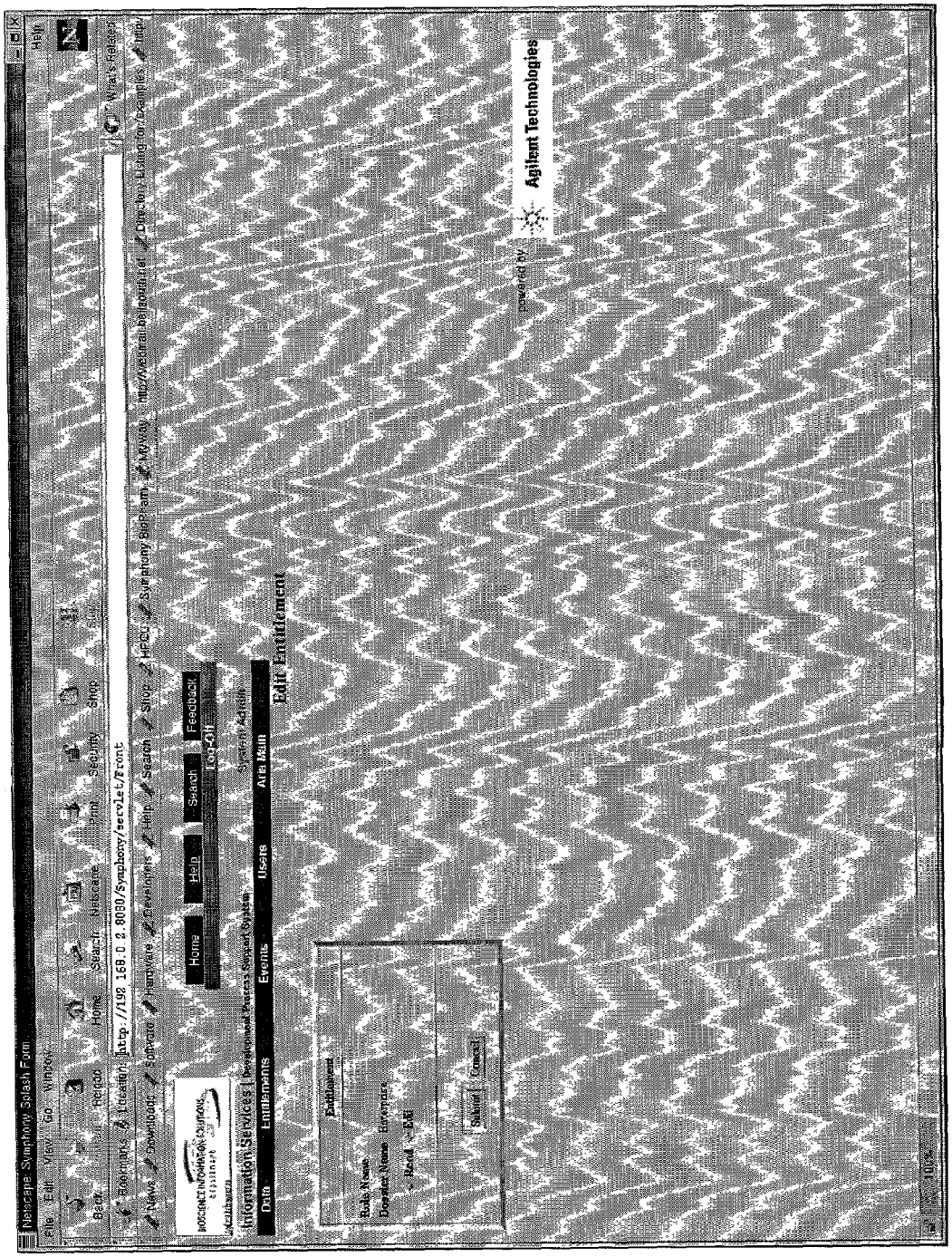
FIG. 16 is a screen print of an example of a Role Entitlement page that is generated when the edit entitlements function is selected from the Dossier Entitlement pane of the Roll Add page.

The system administrator may add a Role by selecting "Add" from the "Roles" pane of the Manage Entitlement page (FIG. 11). This generates the "Role Add" page on the GUI of the system administrator, an example of which is shown in FIG. 15. A "Role" pane appears and prompts the administrator to enter the name of the role and the description of the role, which is a summary of the functions to be carried out by that role. A "Dossier Entitlement" pane is also included in this page, which functions exactly like that appearing in the User Add and User Edit pages, an example of which generates a Role Entitlement page as shown in FIG. 16. Other entitlements which may be available for any of User Add, User Edit or Roll Add, which have not been mentioned heretofore, are entitlement to submit a new file (data) as distinguished from a write capability which only entitles submission of annotations; and entitlement to export data. Once the new Role has been properly set up on the Role Add page and the entitlements have been appropriately set, the administrator submits the page to the system which puts the information into a tree in LDAP, which can then be accessed to authorize use of the system by the new User, according to the stored entitlement settings.

Figure 17:
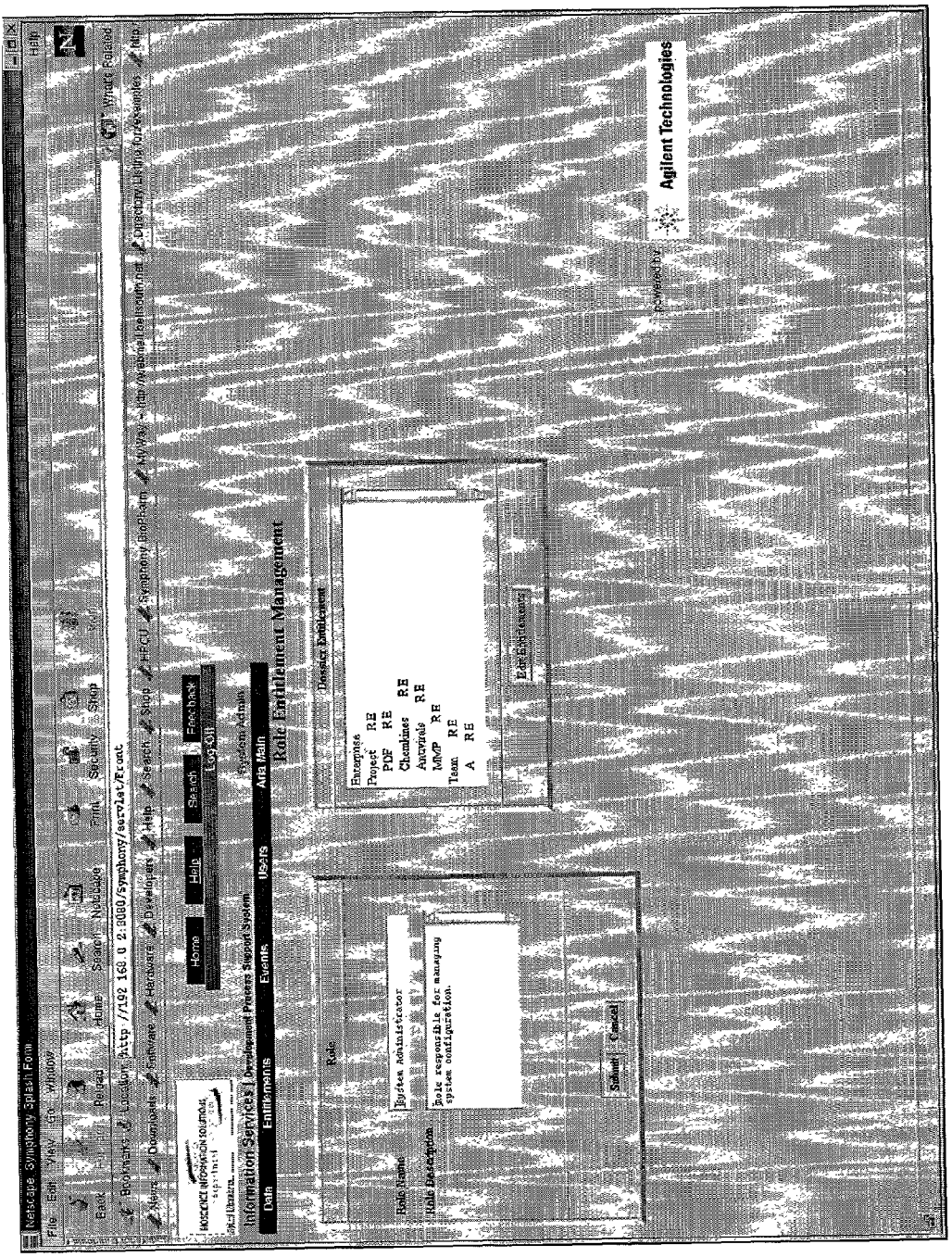
FIG. 17 is a screen print of an example of a Role Edit page, which is generated by selecting "Edit" from the "Roles" pane in the Manage Entitlement page.

Roles may also be edited by the system administrator by selecting "Edit" from the "Roles" pane in the Manage Entitlement page (FIG. 11), which generates a Role Edit page, an example of which is shown in FIG. 17. This page functions very similarly to the Role Add page (FIG. 15) described above, only the information in the Role pane is already filled in and is being accessed to make changes. A Dossier Entitlement pane is also included where the system administrator can add, delete or change the dossiers that that user is to be entitled too. Note that the letters "R E" next to select dossiers shown in FIG. 17 indicate that the Role has both read and editing entitlement to those dossiers. Again, the "Edit Entitlements" button can be selected to allow the administrator to change the level of entitlement of any particular dossier to which the Role is entitled. Anytime the Role information is changed (e.g., role description or dossier entitlements change) an event is generated which is tracked by the traceability function for all artifacts that are associated with this Role.

Figure 18:
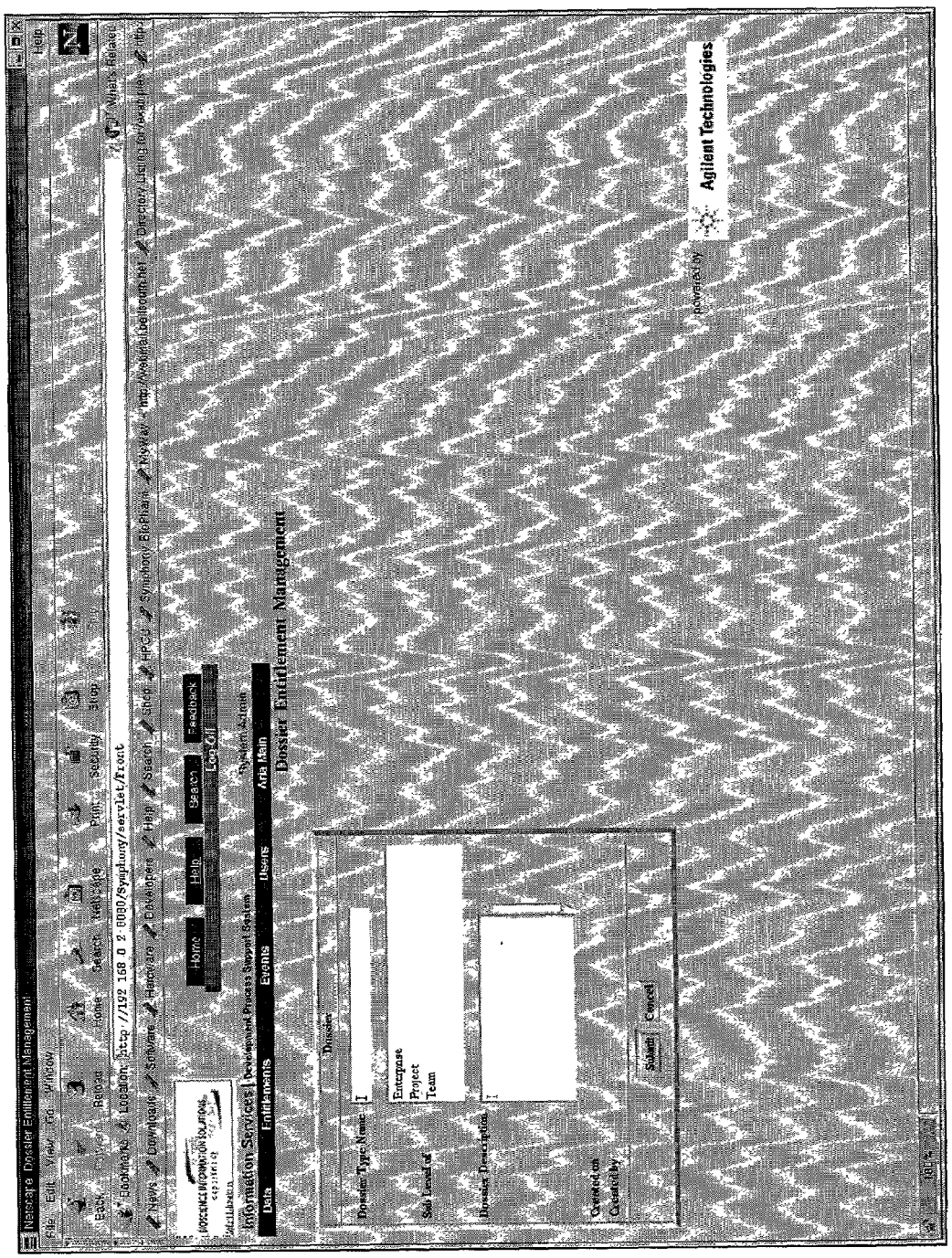
FIG. 18 is a screen print of an example of a Dossier Add page, which is generated by selecting the "Add" button from the "Dossiers" pane in the Manage Entitlement page.

To add a dossier, the system administrator selects the "Add" button from the "Dossiers" pane in the Manage Entitlement page (FIG. 11). This generates the "Dossier Add" page, an example of which is shown in FIG. 18. Only three levels of dossiers are currently shown: "Enterprise", "Project" and "Team". An enterprise dossier was defined above. A team dossier is limited to a group of people that may be working on a subset of a project, and a project dossier is generally set up so that each team dealing with the project is entitled to it. The system administrator creates dossier types, and identifies the type created as a sublevel of one of the three levels noted above, while the individual users can create instances of those types. For example, a User defined in "Team A" could create a dossier under Team A entitled "Compound X Test Data". Every User with entitlement to type "Team A" would also then inherit entitlement to the subtype dossier "Compound X Test Data". Optionally, the system administrator may alternatively give the User the ability to set individual entitlements to the dossier "Compound X Test Data". A description of what the dossier is to be used for, who created it and when, etc., is inputted into the dossier pane where prompted for. Although this information is not currently entered as meta-data on the system, it could be entered and managed in the same manner as other meta-data described herein, so that searches, traceability, etc. could be formed on the dossier descriptive data.

Figure 19:
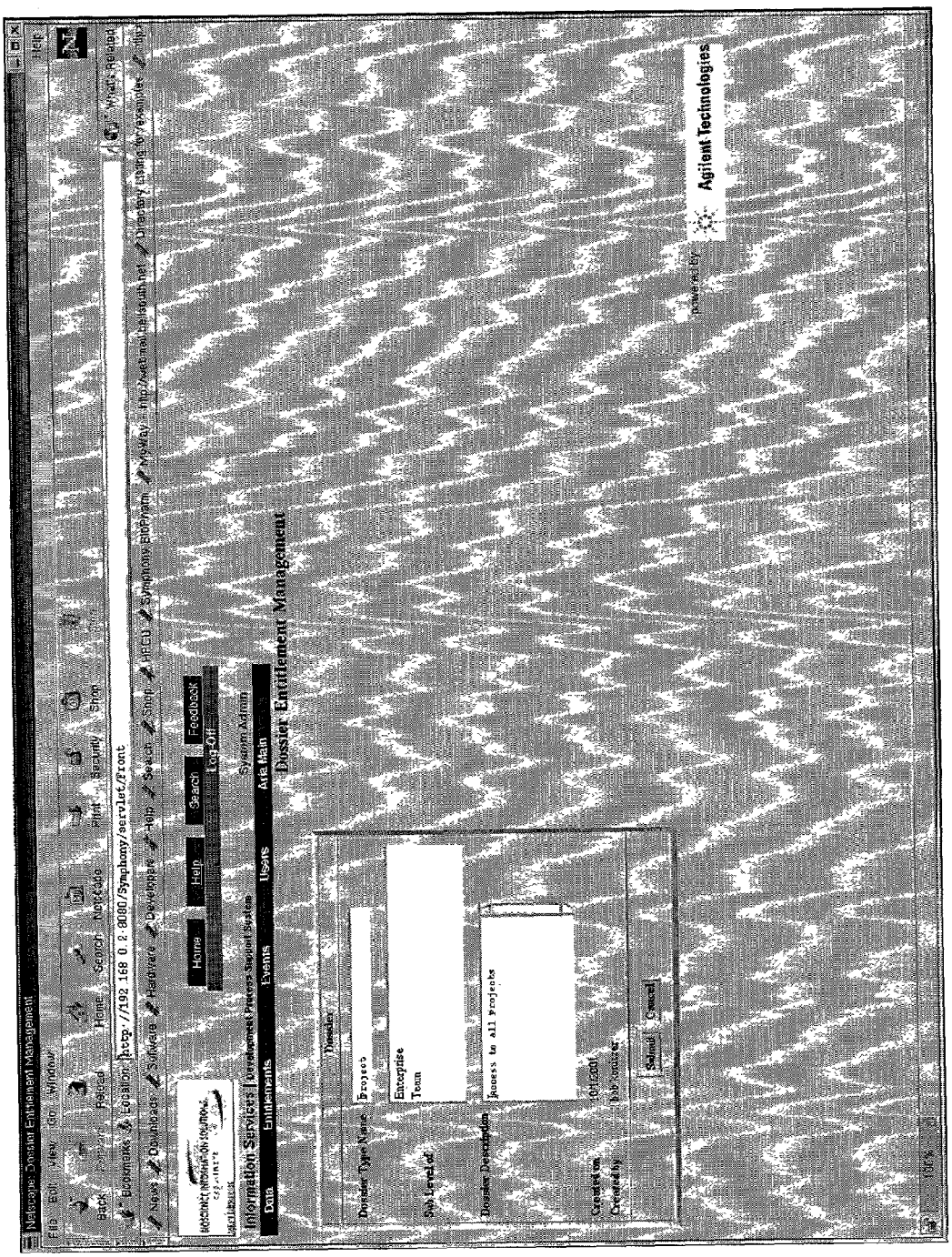
FIG. 19 is a screen print of an example of a Dossier Edit page which is generated by selecting "Edit" from the "Dossiers" pane in the Manage Entitlement page.

Dossiers may also be edited by the system administrator by selecting "Edit" from the "Dossiers" pane in the Manage Entitlement page (FIG. 11), which generates a Dossier Edit page, an example of which is shown in FIG. 19. This page functions very similarly to the Dossier Add page (FIG. 18) described above, only the information in the Dossier pane is already filled in and is being accessed to make changes.

Anytime a dossier is added, or an existing dossier is edited, an event is generated which is tracked by the traceability function for all artifacts that are associated with that dossier.

By selecting "Events" from the Admin page (FIG. 10) an event log can be viewed. By selecting a unique identifier of an artifact, the system searches the stored events table for every event that is associated with the selected unique identifier, and returns an event log that includes every event that was generated and associated with the artifact of interest.

Figure 20:
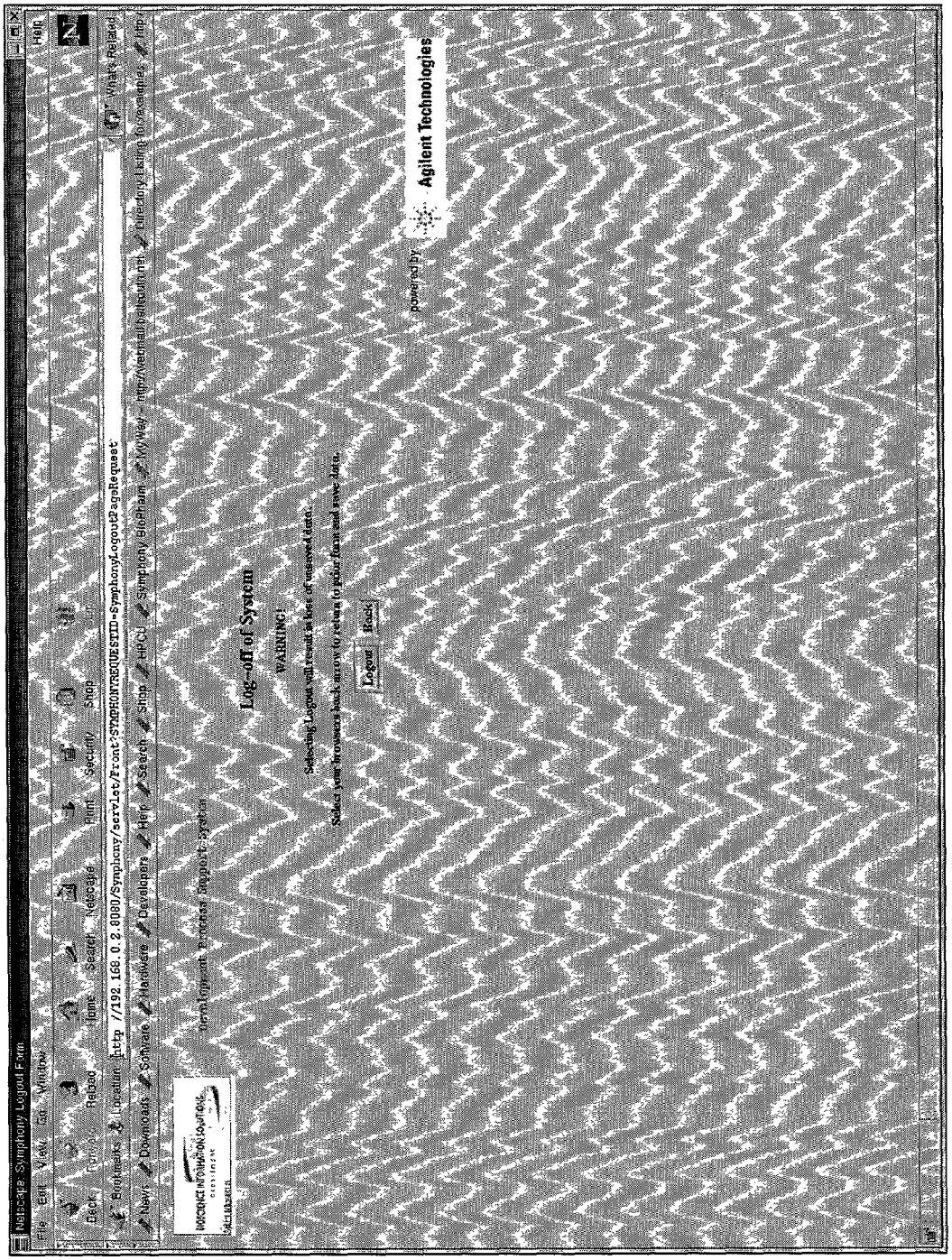
FIG. 20 is a screen print of an example of a log-off screen which is generated when a user or system administrator logs off the system.

FIG. 20 shows a log-off screen which is generated when a user or system administrator logs off the system. The entitlement token that had enabled the user/system administrator to use the system for that session is deleted from the temp file upon logging off, and a new entitlement token must be generated for that same user to use the system. The new entitlement token is generated at the time that the user logs on again.

EXAMPLE

One example of the present invention is tailored to an early stage of the biopharmaceutical life cycle, the drug development phase, which has as a primary goal, the completion of an IND (Investigational New Drug) for submission to the FDA (Food and Drug Administration). (or CTX, as the EU equivalent). In order for this to occur, researchers must be able to identify potential compounds as rapidly as possible and disqualify compounds that do not appear to meet the required indicators. In addition, in order to meet the stringent requirements of the regulatory agencies, the data supporting decisions to continue a compound forward must be readily available and traceable to its source. Researchers and R&D managers must be able to access, manage and track pertinent data regarding compound synthesis, pre-clinical pharmacology, pre-clinical toxicology, and developmental chemistry in order to make informed decisions. The process of completing the IND must also be timely and accurate.

The present invention offers decision related meta-data management functionality to researchers and R&D managers, as well as providing the functionality that enables the completion of an IND. It addresses the following problems faced by researchers and R&D management today:

1. Relevant data often resides in many heterogeneous data-stores, each one having a different interface, ontology and semantics.

2. There is limited use of meta-data to enrich the retrieval and understanding of drug development data.

3. Tracing data to its source is often time consuming and difficult to achieve.

Tracing data forward to documents in which it has been used and accessing researcher conclusions made about specific data is difficult to accomplish, if not impossible to achieve.

4. Data integration efforts are costly and often not successful.

5. There is limited capture of learnings made by researchers in the process of deciding which compounds to kill and which compounds to further explore.

6. Collaboration of researchers across disciplines, across the value chain and across geographies is difficult to achieve.

7. The completion of the IND is a time consuming laborious process, due to the complexity of the effort and the necessity to ensure that all legal requirements have been met.

The present invention contains the following features that address the problems mentioned above.

1. Source Data Open Standard. Source data that is used by the present invention can be images (e.g., jpg) and data of any data type that can be converted to .csv or .rtf. It can come from incompatible, heterogeneous sources. There is no requirement for the source data to be resident in an integrated database. The present invention supports the open systems standard.

2. Fine-grained User Defined Entitlements. The present system's entitlement facilities enable virtual companies and various disciplines within companies to collaborate while protecting confidential information. Entitlements are based on roles rather than levels of security.

3. Traceability. The present invention provides the ability to trace any user defined data, at any level of granularity, to its original source and forwards to conclusions others have drawn about the data.

4. Meta-data Management. The present invention provides the ability for users to identify and search on information they would like to have associated with selected data (at any level of granularity). For instance, a user could associate various meta-data with an assay (e.g., the reason for completing a particular assay). In addition the user has the ability to annotate sets of data and then search on the annotations. Annotations that contribute to major decisions regarding the future of a compound are especially relevant.

5. 21 CFR 11 Compliant. This feature set allows the present invention to meet FDA electronic signature requirements as well as enhancing auditability by regulatory agencies.

6. Shared Dossier. The present invention provides the user with a personal workspace that the user creates and manages and which can be shared by others via the entitlement mechanism.

7. Regulatory Submission Support. The present invention provides access to the data and the development and use of templates needed for the creation and organization of an IND.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, data, architecture, procedure, process step or steps, to the objective, spirit and scope of the present invention. All such modifications are intended to be within the scope of the claims appended hereto.

What is claimed is:

1. A method of managing data within an enterprise-wide, web-based framework said method comprising the steps of:
   marking up data to be managed within the framework with predefined types of meta-data;
   submitting the marked up data to the framework;
   assigning a unique identifier to be associated with the data and a location in which the data is to be stored;
   storing the unique identifier and location for subsequent access to the data;
   assigning a unique primary key to each item of meta-data associated with the data;
   storing each item of meta-data with its unique primary key, type of meta-data and the unique identifier connecting the item of meta-data with the data;
   providing a hierarchy of dossiers into which artifacts, defined by the meta-data stored, are classified;
   defining at least one specified role, team or users;

defining which of the dossiers each user, role or team will be entitled to access;

defining a level of entitlement that each user, role and team has with regard to each dossier, wherein a level of entitlement may be selected from a read only level; a read and edit level; a read, edit and submit new data level; a read, edit and export data level; and a read, edit, submit new data and export level;

allowing a user, role or team access to only those dossiers which the user, role or team has been defined to be entitled to, and only at the entitlement level defined;

allowing users, roles or teams which are entitled to write to a dossier containing the stored meta-data linked to the submitted data to submit new versions of the data, write annotations to the data, or mark the data for deletion;

generating an event for each new version of the data, each annotation to the data, or each marking of the data for deletion; wherein each of these functions is stored with the mete-data associated with the data and is linked to the unique identifier of the data;

storing each event with an associated time stamp; wherein the submission of marked up data generates an event, and wherein other predefined manipulations of the data generate events; and generating a traceability report based on the events, thereby creating a history of all events that have occurred with regard to the data.

2. The method of claim 1, further comprising the step of:
assigning a unique entitlement token to a user upon sign in for access to me framework, wherein the unique entitlement token is good only for the session, and deleting the unique entitlement token upon sign off.

3. The method of claim 1, further comprising rejecting the submitted data prior to said assigning and staring steps if all items of meta-data required by a schema defining the submission have not been entered with the data.

4. The method of claim 1, further comprising rejecting the submitted data prior to said assigning and storing steps if the user submitting the data is not entitled to submit data.

5. The method of claim 1, further comprising the step of:
preventing any overwriting, alteration, editing or deletion of the data and meta-data once the unique identifier has been stored.

6. The method of claim 1, further comprising
allowing annotations to be written with regard to the submitted data by a user with entitlement, and storing the annotations with the meta-data.

7. The method of claim 1, further comprising the step of:
searching on the stored meta-data associated with artifacts selected by a user from a dossier among those dossiers which the user is entitled to, thereby defining a subset of the data collected in the dossier.

8. The method of claim 7, further comprising the step of:
selecting a predefined template from a collection of templates; and
assembling select portions of the subset of data into the selected template.

9. The method of claim 8, further comprising the step of storing the template containing select portions of data as a new artifact, and linking the new artifact to unique identifiers of the select portions of data.

10. The method of claim 8, further comprising the step of exporting the template containing select portions of data to the users local drive.

11. The method of claim 1, wherein users, roles or teams which are entitled to write to a dossier containing the stored meta-data linked to the submitted data can submit new versions of the data, write annotations to the data, or mark the data for deletion; wherein each of these functions generates an event, and wherein each of these functions is stored with the meta-data associated with the data and is linked to the unique identifier of the data.

12. The method of claim 11, wherein the submission of marked up data also generates an event, and wherein other predefined manipulations of the data generate events, each event being stored with an associated time stamp.

13. The method of claim 12, further comprising the step of generating a fraceability report based on the events, thereby creating a history of all events that have occurred with regard to the data.

14. A method of managing data within an enterprise-wide, web-based framework, said method comprising the steps of:
marking up data to be managed within the framework with predefined types of meta-data;
submitting the marked up data to the framework;
assigning a unique identifier to be associated with the data and a location in which the data is to be stored;
storing the unique identifier and location for subsequent access to the data;
assigning a unique primary key to each item of meta-data associated with lie data;
storing each item of meta-data with its unique primary key, type of meta-data and the unique identifier connecting the item of meta-data with the data;
providing a hierarchy of dossiers into which artifacts, defined by the meta-data stored, are classified;
defining at least one specified role, team or users;
defining which of the dossiers each user, role or team will be entitled to access;
defining a level of entitlement that each user, role and team has with regard to each dossier, wherein a level of entitlement may be selected from a read only level; a read and edit level; a read, edit and submit new data level; a read, edit and export data level; and a read, edit, submit new data and export level;
allowing a user, role or team access to only those dossiers which the user. role or team has been defined to be entitled to, and only at the entitlement level defined;
searching on the stored meta-data associated with artifacts selected by a user from a dossier among those dossiers which the user is entitled to, thereby defining a subset of the data collected in the dossier; and
assembling select portions of the subset of data into a template, wherein the template is 21 C.F.R. 11 compliant.

15. A method of managing data within an enterprise-wide, web-based framework, said method comprising the steps of:
marking up data to be managed within the framework with predefined types of mete-data;
submitting the marked up data to the framework;
assigning a unique identifier to be associated with the data and a location in which the data is to be stored;
storing the unique identifier and location for subsequent access to the data;
assigning a unique primary key to each item of meta-data associated with the data;
storing each item of meta-data with its unique primary key, type of meta-data and the unique identifier connecting the item of meta-data with the data;
providing a hierarchy of dossiers into which artifacts, defined by the meta-data stored, are classified;

defining at least one specified role, team or users;

defining which of the dossiers each user, role or team will be entitled to access;

defining a level of entitlement that each user, role and team has with regard to each dossier, wherein a level of entitlement may be selected from a read only level; a read and edit level; a read, edit and submit new data level; a read, edit and export data level; and a read, edit, submit new data and export level;

allowing a user, role or team access to only those dossiers which the user, role or team has been defined to be entitled to, and only at the entitlement level defined;

searching on the stored meta-data associated with artifacts selected by a user from a dossier among those dossiers which the user is entitled to, thereby defining a subset of the data collected in the dossler; and assembling select portions of the subset of data into a template, wherein the template is formatted to comply with requirements for the submission of an Investigational New Drug submission to the FDA.

16. An application adapted to run within an enterprise wide, web-based framework, said application comprising:

a schema requiring predefined types of mete-data to be marked up with new data to be submitted to the framework;

means for assigning a unique identifier to each new data submitted;

means for assigning an address outside of the framework where the new data will be stored;

means for storing the unique identifier associated with the address;

means for assigning primary keys to each item of metadata associated with the new data and storing each item of meta data associated with its primary key, type of meta-data and a foreign key which points to the unique identifier;

means for creating a hierarchical classification of dossiers;

means for assigning data to a selected dossier;

means for defining user entitlement to each dossier created, wherein a system administrator establishes users, roles and teams and defines which of the dossiers each specific user, role or team is entitled to access;

means for preventing access to data in a dossier which a user, role or team is not entitled to access; and means for identifying and searching on information that a user wishes to associate with data selected from a dossier that the user is entitled to, wherein said means for identifying and searching comprises means for formulating a Boolean search based on a preselected dossier or group of dossiers and one or more types of stored meta-data, annotations associated with stored meta-data or stored meta-data and said annotations.

17. The application of claim 16, further comprising:

means for generating an event each time new data is submitted and each time annotations, alterations, or new versions of the data are entered into the application;

means for linking the events to the unique identifier of the associated data; and means for storing the events and linking unique identifiers.

18. The application of claim 17, further comprising:

means for generating a traceability report of the entire history of an artifact of data, based on searching the events generated and stored with regard to that data.

19. The application of claim 16, further comprising:

means for creating a hierarchical classification of dossiers;

means for assigning data to a selected dossier;

means for defining user entitlement to each dossier created, wherein a system administrator establishes users, roles and teams and defines which of the dossiers each specific user, role or team is entitled to access; and means for preventing access to data in a dossier which a user, role or team is not entitled to access.

20. The application of claim 19, further comprising:

means for creating a personal dossier at the user level, which a user can create and manage and which can be shared by other users having entitlement thereto.

21. The application of claim 19, further comprising:

means for identifying and searching on information that a user wishes to associate with data selected from a dossier that the user is entitled to.

22. The application of claim 21, wherein said means for identifying and searching comprises means for performing a similarity search on meta-data associated with the data to find values within a predefined range of a search value.

23. The application of claim 21, wherein said means for identifying and searching comprises means for formulating a Boolean search based on a preselected dossier or group of dossiers and one or more types of stored meta-data, annotations associated with stored meta-data or stored meta-data and said annotations.

24. The application of claim 16, further comprising front means, said front means providing a single point of access to the application for all users.

25. The application of claim 19, further comprising means for assembling selected data into a template.

26. The application of claim 25, further comprising means for exporting the data assembled into a template from the application.

* * * * *